(12) United States Patent
Makita et al.

(10) Patent No.: US 7,719,575 B2
(45) Date of Patent: May 18, 2010

(54) PIXEL SIGNAL PROCESSING APPARATUS AND PIXEL SIGNAL PROCESSING METHOD

(75) Inventors: Junko Makita, Tokyo (JP); Shoutarou Moriya, Tokyo (JP); Hiroaki Sugiura, Tokyo (JP); Koichi Yamashita, Tokyo (JP); Takashi Itow, Tokyo (JP); Tetsuya Kuno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 822 days.

(21) Appl. No.: 10/584,448

(22) PCT Filed: Dec. 10, 2004

(86) PCT No.: PCT/JP2004/018456

§ 371 (c)(1),
(2), (4) Date: Jun. 22, 2006

(87) PCT Pub. No.: WO2005/062626

PCT Pub. Date: Jul. 7, 2005

(65) Prior Publication Data

US 2007/0126896 A1 Jun. 7, 2007

(30) Foreign Application Priority Data

Dec. 22, 2003 (JP) .............................. 2003-424338

(51) Int. Cl.
*H04N 9/07* (2006.01)
*H04N 9/083* (2006.01)

(52) U.S. Cl. ............... 348/222.1; 348/241; 348/242; 358/525; 382/162; 382/167; 382/300

(58) Field of Classification Search ............... 348/272, 348/273, 266
See application file for complete search history.

(56) References Cited

U.S. PATENT DOCUMENTS

| | | | |
|---|---|---|---|
| 6,654,492 B1 * | 11/2003 | Sasai | 382/162 |
| 6,721,003 B1 | 4/2004 | Tsuruoka et al. | |
| 6,970,597 B1 * | 11/2005 | Olding et al. | 382/300 |
| 7,088,392 B2 * | 8/2006 | Kakarala et al. | 348/272 |

(Continued)

FOREIGN PATENT DOCUMENTS

EP  1 416 739 A2  5/2004

(Continued)

*Primary Examiner*—David L Ometz
*Assistant Examiner*—Dwight Alex C Tejano
(74) *Attorney, Agent, or Firm*—Birch, Stewart, Kolasch & Birch, LLP

(57) ABSTRACT

A regression analysis is carried out (8) using pixel signals having a K-th spectral characteristic as the explanatory variable and pixel signals having an L-th spectral characteristic as the purpose variable in a plurality of pixel positions in an area neighboring a pixel of interest to obtain a pixel signal having the L-th spectral characteristic (9). Pixel signals obtained by low-pass filtering (7a-7c) of the output signals of an imaging device may be used as the explanatory variable and the purpose variable. The occurrence of false colors is thereby reduced when, in a group of pixel signals from pixels arrayed on a two-dimensional plane, each pixel having one of a plurality of spectral characteristics, the missing colors at each pixel position are obtained by interpolation.

18 Claims, 22 Drawing Sheets

U.S. PATENT DOCUMENTS

| | | | |
|---|---|---|---|
| 7,333,678 B1 * | 2/2008 | Huang et al. | 348/272 |
| 2002/0163583 A1 * | 11/2002 | Jones | 348/272 |
| 2003/0227552 A1 * | 12/2003 | Watanabe | 348/220.1 |
| 2004/0086177 A1 * | 5/2004 | Zhang et al. | 382/167 |
| 2004/0201721 A1 * | 10/2004 | Baharav et al. | 348/222.1 |
| 2005/0088550 A1 * | 4/2005 | Mitsunaga et al. | 348/272 |
| 2005/0094007 A1 * | 5/2005 | Nomura et al. | 348/272 |
| 2005/0134713 A1 * | 6/2005 | Keshet et al. | 348/273 |
| 2005/0200723 A1 * | 9/2005 | Kondo et al. | 348/222.1 |

FOREIGN PATENT DOCUMENTS

| | | |
|---|---|---|
| JP | 10-13845 A | 1/1998 |
| JP | 11-215512 A | 8/1999 |
| JP | 2000-224601 A | 8/2000 |
| JP | 2001-197512 A | 7/2001 |
| JP | 2001-320720 A | 11/2001 |
| JP | 2004-153823 A | 5/2004 |

* cited by examiner

FIG.2

| R | G | R | G | R |
|---|---|---|---|---|
| G | B | G | B | G |
| R | G | R | G | R |
| G | B | G | B | G |
| R | G | R | G | R |

FIG.3 m ↓ i →

| R(0,0) | G(0,1) | R(0,2) | G(0,3) | R(0,4) |
|---|---|---|---|---|
| G(1,0) | B(1,1) | G(1,2) | B(1,3) | G(1,4) |
| R(2,0) | G(2,1) | R(2,2) | G(2,3) | R(2,4) |
| G(3,0) | B(3,1) | G(3,2) | B(3,3) | G(3,4) |
| R(4,0) | G(4,1) | R(4,2) | G(4,3) | R(4,4) |

FIG.4 (a)

| R(0,4) |  | R(2,4) |  | R(4,4) |
|---|---|---|---|---|
|  |  |  |  |  |
| R(0,2) |  | R(2,2) |  | R(4,2) |
|  |  |  |  |  |
| R(0,0) |  | R(2,0) |  | R(4,0) |

FIG.4 (b)

|  | G(1,4) |  | G(3,4) |  |
|---|---|---|---|---|
| G(0,3) |  | G(2,3) |  | G(4,3) |
|  | G(1,2) |  | G(3,2) |  |
| G(0,1) |  | G(2,1) |  | G(4,1) |
|  | G(1,0) |  | G(3,0) |  |

FIG.4 (c)

|  |  |  |  |  |
|---|---|---|---|---|
|  | B(1,3) |  | B(3,3) |  |
|  |  |  |  |  |
|  | B(1,1) |  | B(3,1) |  |
|  |  |  |  |  |

FIG.9

| R=35 | G=81 | R=25 | G=79 | R=13 |
|---|---|---|---|---|
| G=78 | B=144 | G=78 | B=145 | G=73 |
| R=23 | G=77 | R=9 | G=74 | R=125 |
| G=77 | B=145 | G=76 | B=101 | G=94 |
| R=22 | G=72 | R=145 | G=102 | R=139 |

FIG.10

| | | | | |
|---|---|---|---|---|
| | $R_{LPF}=23$ $G_{LPF}=78$ | $R_{LPF}=17$ $G_{LPF}=77$ | $R_{LPF}=43$ $G_{LPF}=76$ | |
| | $R_{LPF}=16$ $G_{LPF}=77$ | $R_{LPF}=9$ $G_{LPF}=76$ | $R_{LPF}=67$ $G_{LPF}=79$ | |
| | $R_{LPF}=49$ $G_{LPF}=75$ | $R_{LPF}=77$ $G_{LPF}=80$ | $R_{LPF}=104$ $G_{LPF}=86$ | |
| | | | | |

FIG.15

|  |  |  | G(0,3) |  |  |  |
|---|---|---|---|---|---|---|
|  |  |  | R(1,3) |  |  |  |
|  |  |  | G(2,3) |  |  |  |
| G(3,0) | R(3,1) | G(3,2) | R(3,3) | G(3,4) | R(3,5) | G(3,6) |
|  |  |  | G(4,3) |  |  |  |
|  |  |  | R(5,3) |  |  |  |
|  |  |  | G(6,3) |  |  |  |

FIG.17

| | | | B (0,3) | | | |
|---|---|---|---|---|---|---|
| | | | G (1,3) | | | |
| | | | B (2,3) | | | |
| R (3,0) | G (3,1) | R (3,2) | G (3,3) | R (3,4) | G (3,5) | R (3,6) |
| | | | B (4,3) | | | |
| | | | G (5,3) | | | |
| | | | B (6,3) | | | |

FIG.19

| | | | | | | |
|---|---|---|---|---|---|---|
| B(0,0) | | | | | | R(0,6) |
| | R(1,1) | | | | R(1,5) | |
| | | B(2,2) | | B(2,4) | | |
| | | | R(3,3) | | | |
| | | B(4,2) | | B(4,4) | | |
| | R(5,1) | | | | R(5,5) | |
| B(6,0) | | | | | | B(6,6) |

FIG.22

| | | | | | | |
|---|---|---|---|---|---|---|
| | | | | | | |
| | | R(1,2)<br>g(1,2) | | R(1,4)<br>g(1,4) | | |
| | B(2,1)<br>g(2,1) | | B(2,3)<br>g(2,3) | | B(2,5)<br>g(2,5) | |
| | | R(3,2)<br>g(3,2) | G(3,3) | R(3,4)<br>g(3,4) | | |
| | B(4,1)<br>g(4,1) | | B(4,3)<br>g(4,3) | | B(4,5)<br>g(4,5) | |
| | | R(5,2)<br>g(5,2) | | R(5,4)<br>g(5,4) | | |
| | | | | | | |

FIG.24

|   |   |   |   |   |   |   |
|---|---|---|---|---|---|---|
|   |   |   |   |   |   |   |
|   |   |   |   |   |   |   |
|   |   | B(2,2)<br>g(2,2) | G(2,3)<br>b(2,3) | B(2,4)<br>g(2,4) |   |   |
|   |   | G(3,2)<br>b(3,2) | R(3,3)<br>g(3,3) | G(3,4)<br>b(3,4) |   |   |
|   |   | B(4,2)<br>g(4,2) | G(4,3)<br>b(4,3) | B(4,4)<br>g(4,4) |   |   |
|   |   |   |   |   |   |   |
|   |   |   |   |   |   |   |

# PIXEL SIGNAL PROCESSING APPARATUS AND PIXEL SIGNAL PROCESSING METHOD

FIELD OF THE INVENTION

The present invention relates to a pixel signal processing apparatus and a pixel signal processing method, more particularly to a pixel signal processing apparatus and method that, based on a group of pixel signals of pixels obtained from a two-dimensional plane array of pixel positions each having one of a plurality of spectral characteristics, generates, for a pixel position of interest at which there is a pixel signal having one of those spectral characteristics, pixel signals of the other spectral characteristics.

This type of pixel signal processing apparatus is used as part of a color imaging apparatus that also includes a color imaging device having multiple types of photoelectric conversion elements arrayed on a two-dimensional plane, for example, a Bayer array of imaging elements, each having one of a plurality of spectral characteristics such as the three spectral characteristics or colors red (R), green (G), and blue (B); the apparatus is used to interpolate color signals with spectral characteristics that are lacking at each pixel position in the pixel signals output from the image elements.

BACKGROUND ART

In conventional imaging apparatus having imaging elements with a Bayer array of color filters of the three primary colors red, green, and blue, to increase the sense of resolution, the output signal of each pixel is replaced with a mean value based on the local distribution of output signals for each color, thereby employing an interpolation method based on an assumed linear similarity between the known color geometry and the missing color geometry, as shown, for example, in Patent Document 1 below.

Patent Document 1: Japanese Patent Application Publication No. 2000-197512 (paragraphs 0048 to 0049, FIG. 7.)

DISCLOSURE OF THE INVENTION

Problems to be Solved by the Invention

A problem in this conventional method, in which interpolation is carried out on the basis of correlation between the color signals in a local area, is the occurrence of false colors due to misapprehension of the correlation relationship between colors. An example of this problem occurs in the neighborhood of a site of a sudden change in the output signal, that is, near a boundary between one color and another color: the generated signal levels deviate greatly from the curve of signal variation, giving rise to black or white smears or false colors that were not present in the original image.

Means of Solution of the Problems

In a pixel signal processing apparatus that, given a group of pixel signals from pixels arrayed on a two-dimensional plane, each pixel having one of a first to an N-th spectral characteristic, generates a pixel signal having an L-th spectral characteristic at a first pixel position of interest where there is a pixel signal having a K-th spectral characteristic (K and L being different integers between 1 and N, inclusive), an imaging apparatus according to the present invention has:

regression analysis means for performing a regression analysis in a plurality of pixel positions in an area neighboring the first pixel position of interest, using the pixel signals having the K-th spectral characteristic as the explanatory variable and the pixel signals having the L-th spectral characteristic as the purpose variable, to calculate a regression equation expressing a correlation of the pixel signal having the K-th spectral characteristic with the pixel signal having the L-th spectral characteristic; and a calculating means for determining the pixel signal having the L-th spectral characteristic at the pixel position of interest by applying a conversion formula based on the regression equation to the pixel signal having the K-th spectral characteristic at the pixel position of interest.

Effect of the Invention

A pixel signal processing apparatus according to this invention, being structured as above, can calculate a generated signal fitting the correlation relationship between the pixel signals with the K-th and L-th spectral characteristics at pixel positions in the area neighboring the first pixel position of interest. Even when the first pixel of interest is located near a color boundary, accordingly, it is not directly affected by the output signals of the pixels at the color boundary, because the L-th generated signal is calculated from the regression equation indicating the correlation relationship between the pixels in the area neighboring the first pixel position of interest. Any correlation relationship can be dealt with, because the correlation relationship is expressed mathematically. The occurrence of false colors such as the black or white smears seen with conventional methods can therefore be reduced.

BRIEF DESCRIPTION OF THE DRAWINGS

FIG. 2 illustrates a Bayer array of color filters of the three primary colors red, green, and blue.

FIG. 3 schematically illustrates the two-dimensional arrangement of output signals in a two-dimensional imaging device with a Bayer array of color filters.

FIGS. 4(a), 4(b), and 4(c) separately illustrate the two-dimensional arrangement of each color in FIG. 3.

FIG. 9 shows exemplary values of the output signal obtained by analog-to-digital conversion of the output of the imaging device.

FIG. 10 illustrates low-pass filter outputs calculated from the output signal values in FIG. 9 in the first embodiment of the invention.

FIG. 15 illustrates the arrangement of pixels referred to in generating the missing green color when the pixel of interest has a red output signal in the second embodiment of the invention.

FIG. 17 illustrates the arrangement of pixels referred to in generating the missing red and blue colors when the pixel of interest has a green output signal in the second embodiment of the invention.

FIG. 19 illustrates the arrangement of pixels referred to in generating the missing blue color when the pixel of interest has a red output signal in the second embodiment of the invention.

FIG. 22 illustrates the arrangement of pixels referred to in generating the missing red and blue colors when the pixel of interest has a green output signal in the third embodiment of the invention.

FIG. 24 illustrates the arrangement of pixels referred to in generating the missing blue color when the pixel of interest has a red output signal in the third embodiment of the invention.

Figure 1:
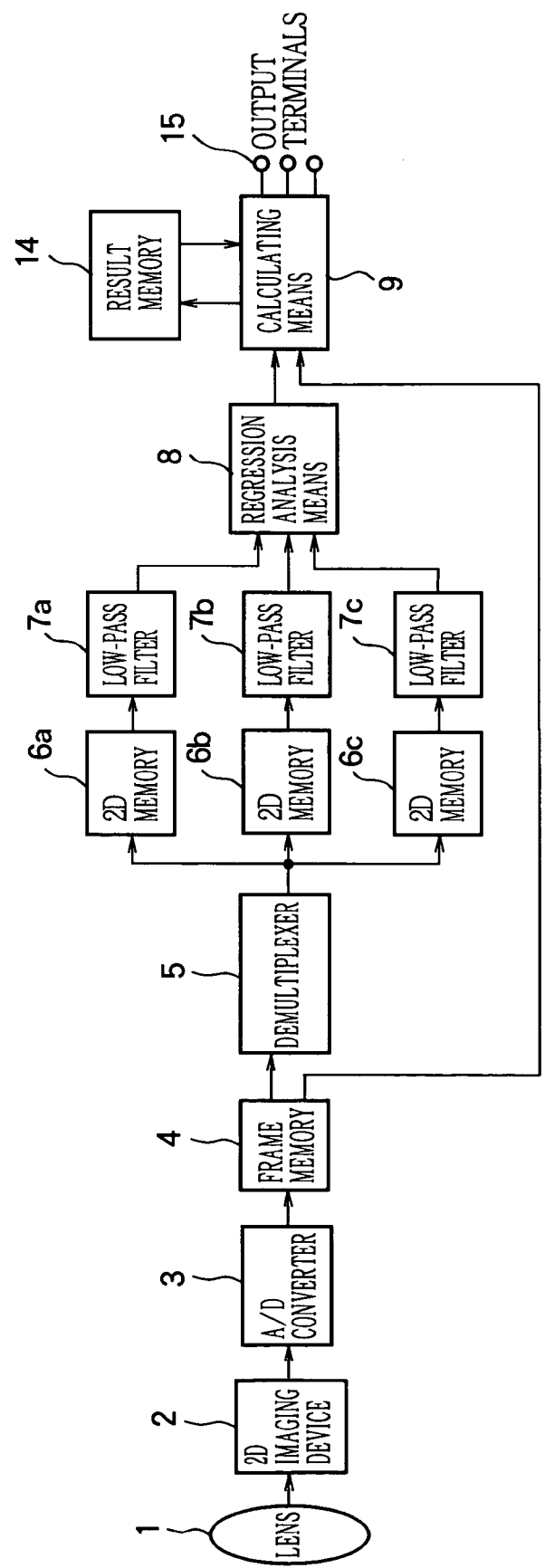
FIG. 1 is a block diagram showing the structure of an imaging device such as a digital still camera equipped with the pixel signal processing apparatus of a first embodiment of this invention.

EXPLANATION OF REFERENCE CHARACTERS 2 two-dimensional imaging device, 7a-7c low-pass filters, 8, 10, 12 regression analysis means, 9, 13 calculating means

BEST MODE OF PRACTICING THE INVENTION

Embodiments of the invention will now be described with reference to the attached drawings. The embodiments described below are suitable for use in a digital still camera, but applications of this invention are not limited thereto.

First Embodiment

FIG. 1 is a block diagram showing the structure of an imaging device having pixel signal processing apparatus according to the first embodiment of the invention. Light incident on a lens 1 is focused on, for example, a two-dimensional imaging device 2 with color filters having spectral characteristics corresponding to the red (R), green (G), and blue (B) primary colors arranged in a Bayer array as shown in FIG. 2.

The two-dimensional imaging device 2 carries out photoelectric conversion of the incident light and outputs an analog signal at a level according to the intensity of the incident light. The analog signal is converted to a digital signal by an analog-to-digital (A/D) converter 3, then output and stored in a frame memory 4.

The pixel signals stored in the frame memory 4 are demultiplexed by a demultiplexer 5 into the red, green, and blue colors and stored separately in two-dimensional memories 6a, 6b, 6c. Red signals are stored in two-dimensional memory 6a, green signals in two-dimensional memory 6b, and blue signals in two-dimensional memory 6c. Low-pass filters (LPFs) 7a, 7b, 7c are provided for the two-dimensional memories 6a, 6b, 6c to perform low-pass filtering of the pixel signals read from the memories 6a, 6b, 6c and output the results.

Because the red, green, and blue color filters of the two-dimensional imaging device 2 are disposed at the positions of the corresponding pixels in, for example, the Bayer array shown in FIG. 2, a pixel signal of only one color is obtained from each pixel position; the pixel signals of the other two colors are not obtained. In other words, at each pixel position a pixel signal of only one color is present; the pixel signals of the other colors are absent.

The colors of the pixels signals that are absent will be referred to below as 'missing colors'. In the output of the imaging device 2, for example, the missing colors at a pixel position where a red pixel signal is present are green and blue.

In the present invention, the regression analysis means 8 and calculating means 9 use the pixel signals output from the low-pass filters 7a-7c to obtain pixel signals of the missing colors at each pixel position by interpolation.

The interpolation procedure includes the following six processes.

(P1) A process for determining the green pixel signal at pixel positions where a red pixel signal is present
(P2) A process for determining the green pixel signal at pixel positions where a blue pixel signal is present
(P3) A process for determining the red pixel signal at pixel positions where a green pixel signal is present
(P4) A process for determining the blue pixel signal at pixel positions where a green pixel signal is present
(P5) A process for determining the blue pixel signal at pixel positions where a red pixel signal is present
(P6) A process for determining the red pixel signal at pixel positions where a blue pixel signal is present These six processes can be generalized as:
Calculate L signal (L=R, G, or B) at
K pixel position (K=R, G, or B, K≠L)

Each of these six processes is carried out at every pixel position on the screen (in one frame).

The six processes above may be carried out sequentially. When the six processes above are carried out at each pixel position (which then becomes the pixel position of interest) the regression analysis means 8 receives the pixel signals of the K-th and L-th colors in an area neighboring the pixel position of interest (an area including the first pixel of interest and its surrounding pixels (within a predetermined distance of the pixel of interest)) from the relevant low-pass filters (two of the filters 7a-7c) and calculates a regression equation expressing the correlation between the received pixel signals.

The calculating means 9 uses the constants in the regression equation calculated by the regression analysis means 8 and the pixel signal of the K-th color at the pixel position of interest (the output of the imaging device 2), which is stored in the frame memory 4, to calculate the pixel signal of the L-th color at the pixel position of interest, and stores the pixel signal resulting from the calculation in the result memory 14.

The pixel signal resulting from the above calculation will be referred to below as the 'generated pixel signal' or simply the 'generated signal'. The pixel signals obtained as results of filtering in the low-pass filters 7a-7c may be referred to simply as 'low-pass filter outputs'. The pixel signals before the low-pass filtering, that is, the pixel signals obtained by A/D conversion of the outputs of the imaging device, may be referred to simply as 'output signals'. As A/D conversion only changes the form of the signals, the pixel signals stored in the frame memory 4 may also be referred to as the pixel signals output from the imaging device 2, or the output signals of the imaging device.

When all six processing steps above have been completed, pixel signals are present for the missing colors at all pixel positions on the screen. The combination of the generated signals stored in the result memory 14 and the output signals stored in the frame memory 4 forms a complete set of pixel signals for all colors (red, green, blue) in all pixel positions on one screen. The calculating means 9 outputs this set of pixel signals, formed by the combination of the generated signals stored in the result memory 14 and the output signals stored in the frame memory 4, as an RGB color signal.

The embodiment will be described in detail below.

FIG. 3 schematically illustrates a two-dimensional arrangement of the pixel signals obtained by A/D conversion of the outputs of the imaging device 2. Each grid cell in the drawing indicates a pixel position. The letter R, G, or B and the numerals in parentheses in the cells indicate the color of the pixel signal and the coordinates of the pixel position (l=row, m=column).

As shown in FIG. 3, in the output signals, at each pixel position there is a pixel signal of only one color; there are no pixel signals of the other colors at the same pixel position. In other words, the pixel signals are arranged so that different colors never occupy the same pixel position.

The outputs of the A/D converter 3 are stored in the frame memory 4 as described above, and the signals read from the frame memory 4 are demultiplexed by the demultiplexer 5 and stored, color by color, into the two-dimensional memories 6a, 6b, 6c.

FIGS. 4(a) to 4(c) schematically illustrate the pixel signals stored in the two-dimensional memories 6a to 6c, and their positions.

As shown in the drawings, the output signals of each color fail to occupy all the pixel positions: for example, only one in four pixel positions is occupied by a red output signal, leaving three pixel positions for pixel signals of the other colors; only one in two pixel positions is occupied by a green color output signal, leaving one pixel position for a pixel signal of another color; only one in four pixel positions is occupied by a blue color output signal, leaving three pixel positions for pixel signals of the other colors.

The pixel signal processing apparatus of the invention obtains the pixel signals of all the missing colors at each pixel position by interpolation.

Figure 5:
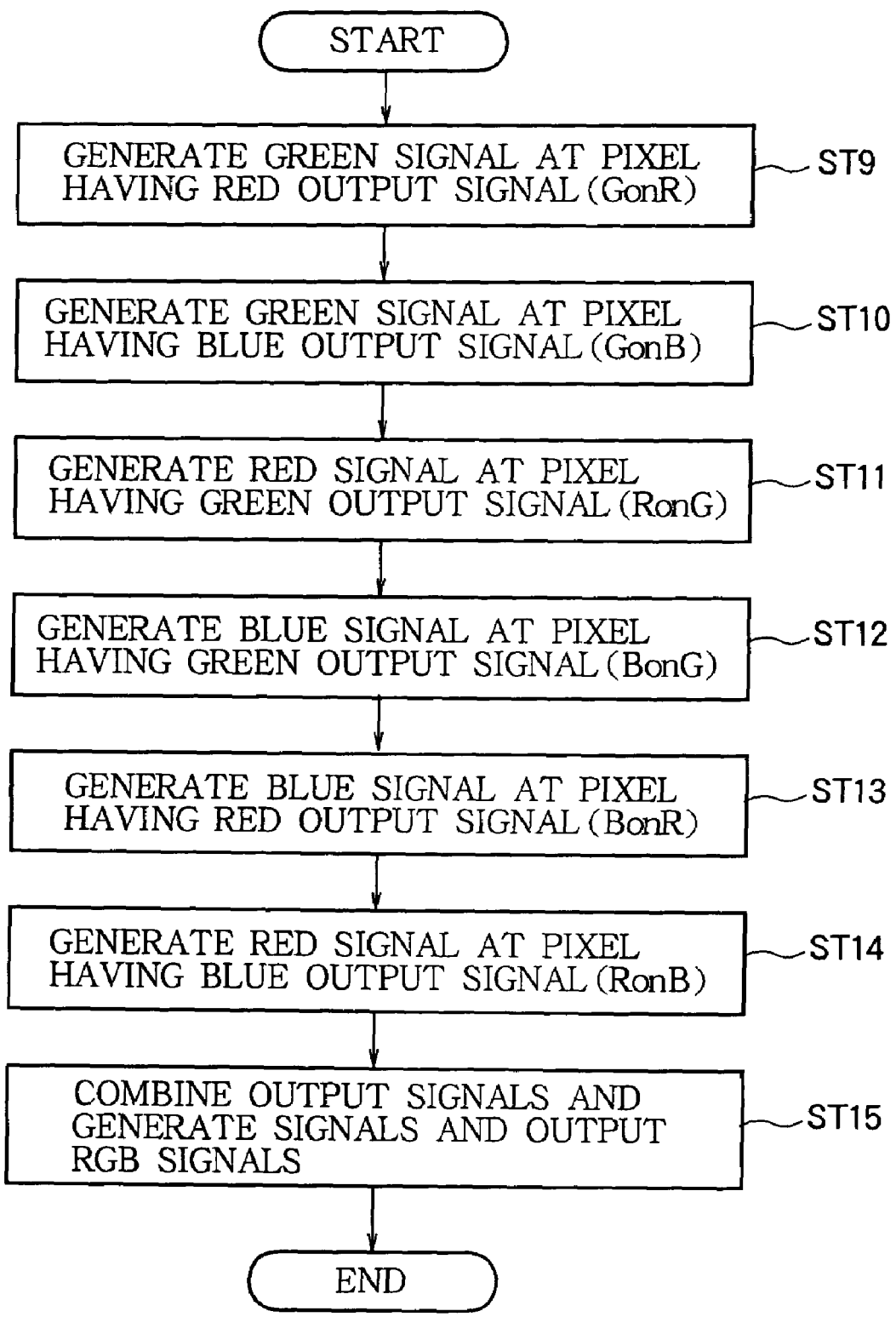
FIG. 5 is a flowchart illustrating the interpolation procedure in the three embodiments of the invention described herein.

An interpolation process for generating the missing color pixel signals at each pixel position, performed by the low-pass filters 7a to 7b, regression analysis means 8, and calculating means 9, will be described in more detail below. FIG. 5 is a flowchart illustrating the interpolation procedure.

In the following description, when a pixel signal is present at a certain pixel position in the output of the imaging device 2, this may be expressed by saying that the pixel 'has an output signal', and when a pixel signal is absent at the pixel position, this may be expressed by saying that the pixel 'has no output signal'.

First, green signals are generated at pixel positions having red output signals (step ST9). Next, green signals are generated at pixel positions having blue output signals (step ST10). Next, red signals are generated at pixel positions having green output signals (step ST11). Next, blue signals are generated at pixel positions having green output signals (step ST12). Next, blue signals are generated at pixel positions having red output signals (step ST13). Finally, red signals are generated at pixel positions having blue output signals (step ST14).

Figure 6:
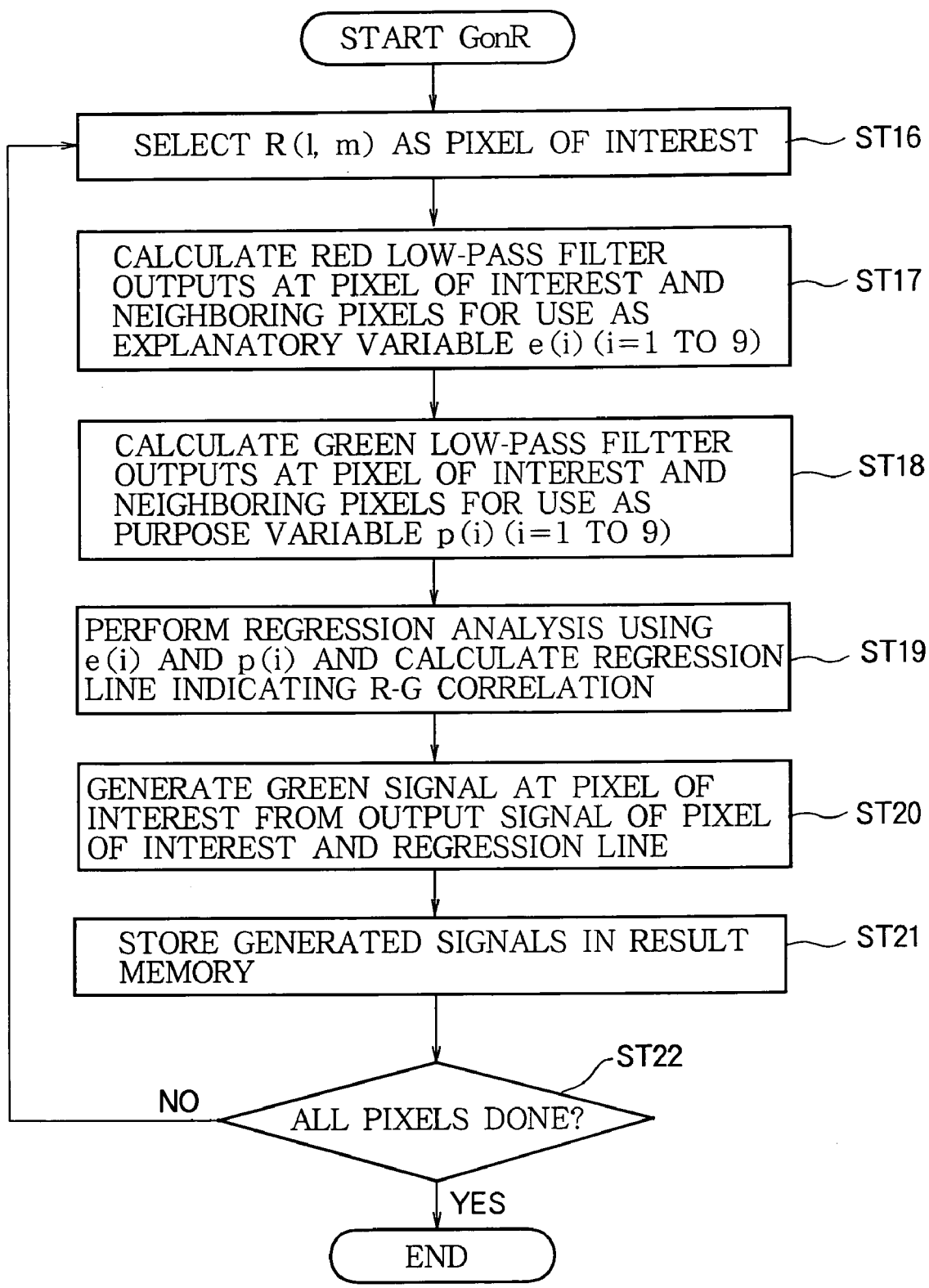
FIG. 6 is a flowchart illustrating the procedure for generating a green signal at a pixel having a red output signal in the first embodiment of the invention.

Next, assuming that a pixel having a red output signal is selected as the pixel of interest, the process (step ST9) for generating the green signal, which is one of the missing colors of the pixel of interest, will be described in detail. FIG. 6 is a flowchart illustrating the procedure of step ST9.

Suppose, for example, that the pixel at position (2, 2) in FIG. 3, having a red output signal, is selected as the pixel of interest (step ST16). The notation 'R(2, 2)' may be used as shown in step ST16 in FIG. 6 to indicate that the pixel at position (2, 2) has a red (R) output signal. Similar notation will be applied below to pixels having output signals of the other colors.

When the pixel at the pixel position (2, 2) in FIG. 3, having a red output signal, is selected as the pixel of interest as described above, the regression analysis means 8 receives data from the low-pass filters 7a, 7b, the data including the red and green low-pass filter outputs at the pixel positions in an area neighboring the pixel position (2, 2) of interest in FIG. 3, that is, at the pixel position (2, 2) of interest and its eight surrounding pixel positions (1, 1), (1, 2), (1, 3), (2, 1), (2, 3), (3, 1), (3, 2), (3, 3).

In the example shown in FIG. 3, the surrounding pixel positions are defined as the pixel positions within a distance of one pixel from the pixel of interest in the horizontal and vertical directions.

The low-pass filter outputs may be obtained as a mean value of the output signals of the pixels having the same color that are present within a predetermined area. Specifically, when the mean value of the output signals of the pixels of the same color included within a 3×3 area is defined as the low-pass filter output at the center position in the area, the mean value of the output signals of the four red pixels included in the 3×3 region, shown by thick lines in FIG. 4(a), becomes the low-pass filter output for the red color at the center position (l=1, m=1) of the 3×3 area. Accordingly, the red low-pass filter outputs at the nine pixel positions (1, 1), (1, 2), (1, 3), (2, 1), (2, 2), (2, 3), (3, 1), (3, 2), (3, 3) in FIG. 3 can be obtained from the following equations (4) to (12), where the notation $R_{LPF}$ indicate a red low-pass filter output.

$$R_{LPF}(1, 1)=(R(0, 0)+R(0, 2)+R(2, 0)+R(2, 2))/4 \quad (4)$$

$$R_{LPF}(1, 2)=(R(0, 2)+R(2, 2))/2 \quad (5)$$

$$R_{LPF}(1, 3)=(R(0, 2)+R(0, 4)+R(2, 2)+R(2, 4))/4 \quad (6)$$

$$R_{LPF}(2, 1)=(R(2, 0)+R(2, 2))/2 \quad (7)$$

$$R_{LPF}(2, 2)=R(2, 2) \quad (8)$$

$$R_{LPF}(2, 3)=(R(2, 2)+R(2, 4))/2 \quad (9)$$

$$R_{LPF}(3, 1)=(R(2, 0)+R(2, 2)+R(4, 0)+R(4, 2))/4 \quad (10)$$

$$R_{LPF}(3, 2)=(R(2, 2)+R(4, 2))/2 \quad (11)$$

$$R_{LPF}(3, 3)=(R(2, 2)+R(2, 4)+R(4, 2)+R(4, 4))/4 \quad (12)$$

Similarly, the green low-pass filter outputs at the nine pixel positions (1, 1), (1, 2), (1, 3), (2, 1), (2, 2), (2, 3), (3, 1), (3, 2), (3, 3) in FIG. 3 can be obtained by the following equations (13) to (21), where the character $G_{LPF}$ indicates a green low-pass filter output.

$$G_{LPF}(1, 1)=(G(0, 1)+G(1, 0)+G(1, 2)+G(2, 1))/4 \quad (13)$$

$$G_{LPF}(1, 2)=(G(0, 1)+G(0, 3)+G(1, 2)+G(2, 1)+G(2, 3))/5 \quad (14)$$

$$G_{LPF}(1, 3)=(G(0, 3)+G(1, 2)+G(1, 4)+G(2, 3))/4 \quad (15)$$

$$G_{LPF}(2, 1)=(G(1, 0)+G(1, 2)+G(2, 1)+G(3, 0)+G(3, 2))/5 \quad (16)$$

$$G_{LPF}(2, 2)=(G(1, 2)+G(2, 1)+G(2, 3)+G(3, 2))/4 \quad (17)$$

$$G_{LPF}(2, 3)=(G(1, 2)+G(1, 4)+G(2, 3)+G(3, 2)+G(3, 4))/5 \quad (18)$$

$$G_{LPF}(3, 1)=(G(2, 1)+G(3, 0)+G(3, 2)+G(4, 1))/4 \quad (19)$$

$$G_{LPF}(3, 2)=(G(2, 1)+G(2, 3)+G(3, 2)+G(4, 1)+G(4, 3))/5 \quad (20)$$

$$G_{LPF}(3, 3)=(G(2, 3)+G(3, 2)+G(3, 4)+G(4, 3))/4 \quad (21)$$

The regression analysis means 8 uses the red low-pass filter outputs $R_{LPF}$ obtained in equations (4) to (12) as an explanatory variable e(i) (step ST17) and the green low-pass filter outputs $G_{LPF}$ obtained in equations (13) to (21) as a purpose variable p(i) (step ST18), and performs a regression analysis to calculate a regression line represented by equation (22) below (step ST19).

$$G_{LPF}=a \times R_{LPF}+b \quad (22)$$

Figure 7:
FIG. 7 schematically illustrates a regression line obtained from a set of nine data points representing output from the red and green low-pass filters.

An example of a regression line is shown in FIG. 7. The regression equation expressing this type of regression line is obtained by the least squares method using the low-pass filter outputs $G_{LPF}$ as the purpose variable and the low-pass filter outputs $R_{LPF}$ as the explanatory variable.

Figure 8:
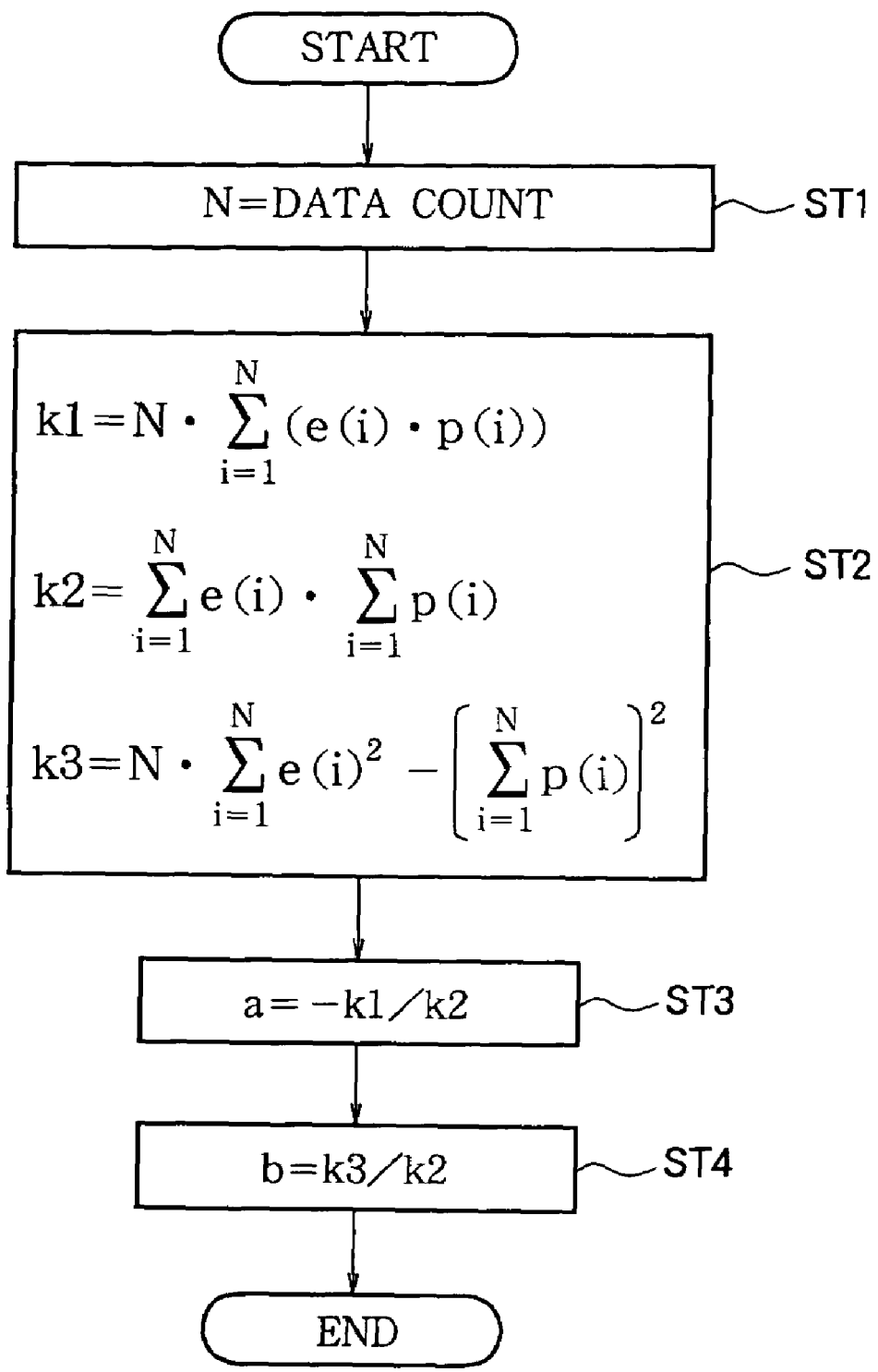
FIG. 8 is a flowchart illustrating the calculation of the slope and intercepts of the regression line in the three embodiments of the invention.

FIG. 8 is a flowchart illustrating the detailed correlation calculation procedure performed in step ST19 to calculate the constants 'a' (slope) and 'b' (intercept) of the regression line. The explanatory variable is denoted by e(i), the purpose variable by p(i), the total number of data points by N (in the above example, N=9), and the data index by i (i=1 to N).

As shown in FIG. 8, first, in the data count setting step ST1, the total number of data points used for the calculation is set. Next, in the multiplication and addition step ST2, multiplication and addition operations are performed on the explanatory variable and purpose variable to calculate parameters k1, k2, k3. Next, in the slope calculation step ST3, the slope 'a' of the regression line is calculated using the parameters k1 and k2 obtained in step ST2. Finally, in the intercept calculation step ST4, the intercept 'b' of the regression line is calculated using the parameters k2 and k3 obtained in step ST2.

The regression line thus obtained represents a correlation between the red and green colors in an area neighboring the pixel of interest, so the red and green signals at the pixel of interest can be presumed to have values near this regression line.

The calculating means 9 receives the constants 'a' and 'b' calculated by the regression analysis means 8 giving the slope and intercept of the regression line and the output signal R(2, 2) of the pixel of interest stored in the frame memory 4 and performs a conversion based on equation (23) below, thereby generating the green signal g(2, 2) at the position of the pixel of interest (step ST20). The green, red, and blue signals generated as in the above example will be indicated by the lower-case letters 'g', 'r', and 'b', respectively.

$$g(2, 2)=a \times R(2, 2)+b \quad (23)$$

The generated signals are stored into the result memory 14 (step ST21).

The above processes are repeated with different pixels of interest, that is, by selecting different pixels as the pixel of interest (step ST22). Naturally, every time the pixel of interest is changed, its surrounding pixels change and the regression analysis is performed using these different pixels, so that different values of the constants 'a' and 'b' are obtained for use in obtaining the generated signal for each pixel.

The process in step ST9 in FIG. 5 is thereby completed.

In each of steps ST10 to ST14, a series of processes similar to the above is performed as in step ST9 but with different colors.

When steps ST9 to ST14 in FIG. 5 are all completed, the missing colors of all pixels have been interpolated, so that if the output signals (the pixel signals obtained by A/D conversion of the outputs of the imaging device 2) and the generated signals (the pixel signals obtained by interpolation) are combined, pixel signals of all colors are obtained for all pixels. That is, a color image filling one screen is obtained. The calculating means 9 accordingly combines the generated signals stored in the result memory 14 with the output signals stored in the frame memory 4 and outputs them as RGB signals (step ST15).

In the above example, the order in which the color signals are generated is not limited to the order shown in FIG. 5; the order can be changed.

The above interpolation method enables interpolation by generating signals according to regression lines expressing an arbitrary correlation relationship among the color signals of the pixel of interest and its surrounding pixels. Therefore, the image degradation problems in the method described in Patent Document 1 above (Japanese Patent Application Publication No. 2001-197512), such as black or white smears occurring near color boundaries, is greatly mitigated.

Figure 11:
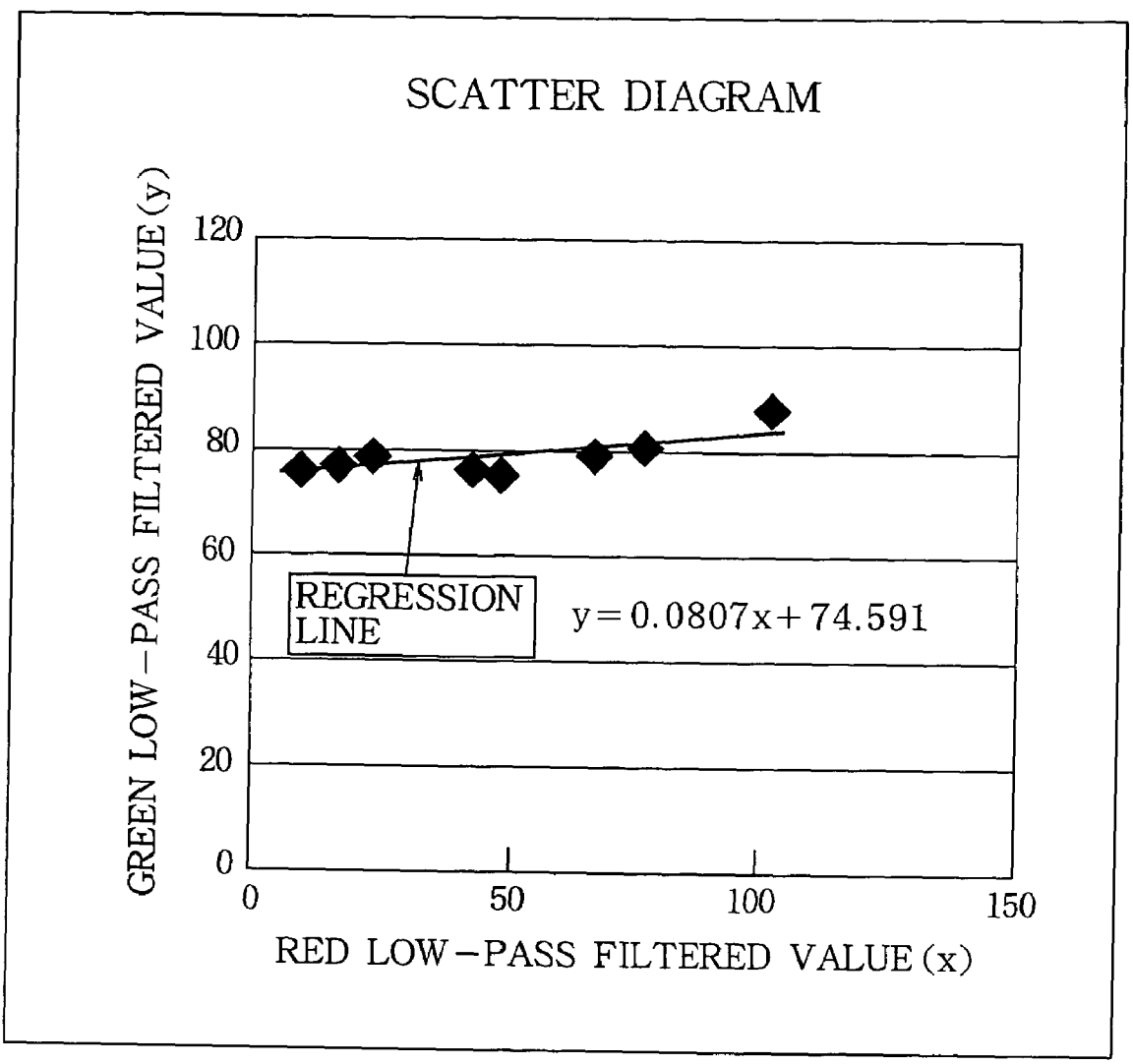
FIG. 11 illustrates a regression line obtained from the low-pass filter outputs in FIG. 10 in the first embodiment of the invention.

When output signals having the numeric values shown in FIG. 9 are obtained from the pixels and a color boundary is present at the location indicated by the dotted line, for example, the red and green low-pass filter outputs at the central pixel (the pixel of interest) and its surrounding pixels become take the values shown in FIG. 10. The regression line obtained from these values is shown in FIG. 11. The slope and intercept of this regression line are 0.0807 and 74.591, respectively. By substituting these results and the output signal of the pixel of interest, i.e., R(2, 2)=9, into equation (23), the missing green signal is calculated as shown in the following equation (24).

$$g(2, 2)=0.0807 \times 9+74.591 \approx 75 \quad (24)$$

The value g(2, 2) thus calculated is near the green color values of the surrounding pixels. Image degradation such as black or white smears and the like does not occur near the color boundary.

In the above example, the low-pass filter takes the simple average of the output signals of surrounding pixels, but it may also take a weighed average.

Second Embodiment

Figure 12:
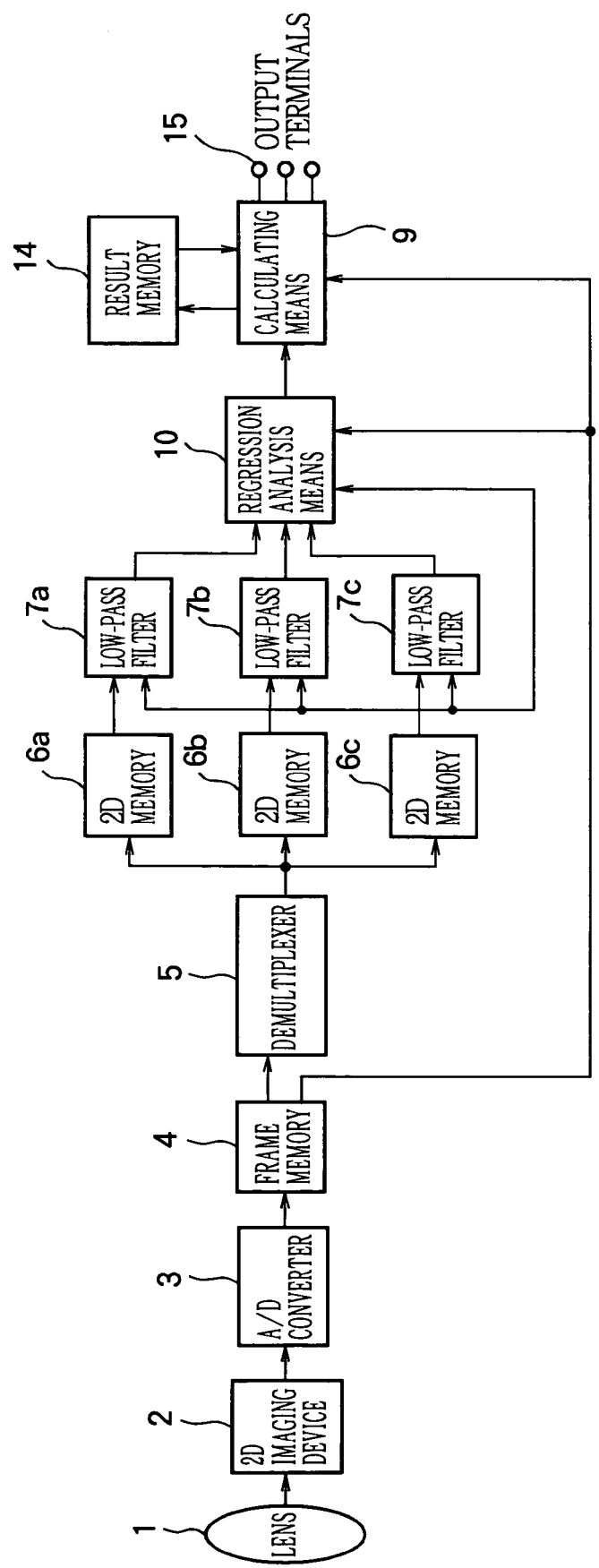
FIG. 12 is a block diagram showing the structure of an imaging device such as a digital still camera equipped with a pixel signal processing apparatus according to a second embodiment of the invention.

FIG. 12 is a block diagram showing the structure of an imaging device having pixel signal processing apparatus according to a second embodiment of the invention.

The second embodiment has the same structure as the first embodiment except for the regression analysis means 10 and low-pass filters 7a to 7c.

The regression analysis means 10 of the present embodiment determines image similarities surrounding a pixel of interest prior to the calculation of its regression line. Specifically, for example, the regression analysis means 10 calculates differences between the output signals (pixel signals obtained by A/D conversion of the outputs of the imaging device 2) of two pixels and compares them, the two pixels being selected from among pixels having output signals of the same color as the color to be generated as one of the missing colors of the pixel of interest and positioned on opposite sides of the pixel of interest in the vertical, horizontal, or diagonal direction. The regression analysis means 10 then determines that the direction of the line connecting the two pixels having the smallest output signal difference is the direction in which a strong similarity exists.

From among the pixels aligned in this direction of strong similarity, the regression analysis means 10 selects a plurality of pixels having the same color as the output signal of the pixel of interest, and receives the output signals of the selected pixels from the frame memory 4 and the low-pass filter outputs of the selected pixels from the low-pass filters 7a to 7c.

Regression analysis is then performed using the output signals of the selected pixels as an explanatory variable and the low-pass filter outputs of the selected pixels as a purpose variable to calculate a regression line expressing a color correlation.

Figure 13:
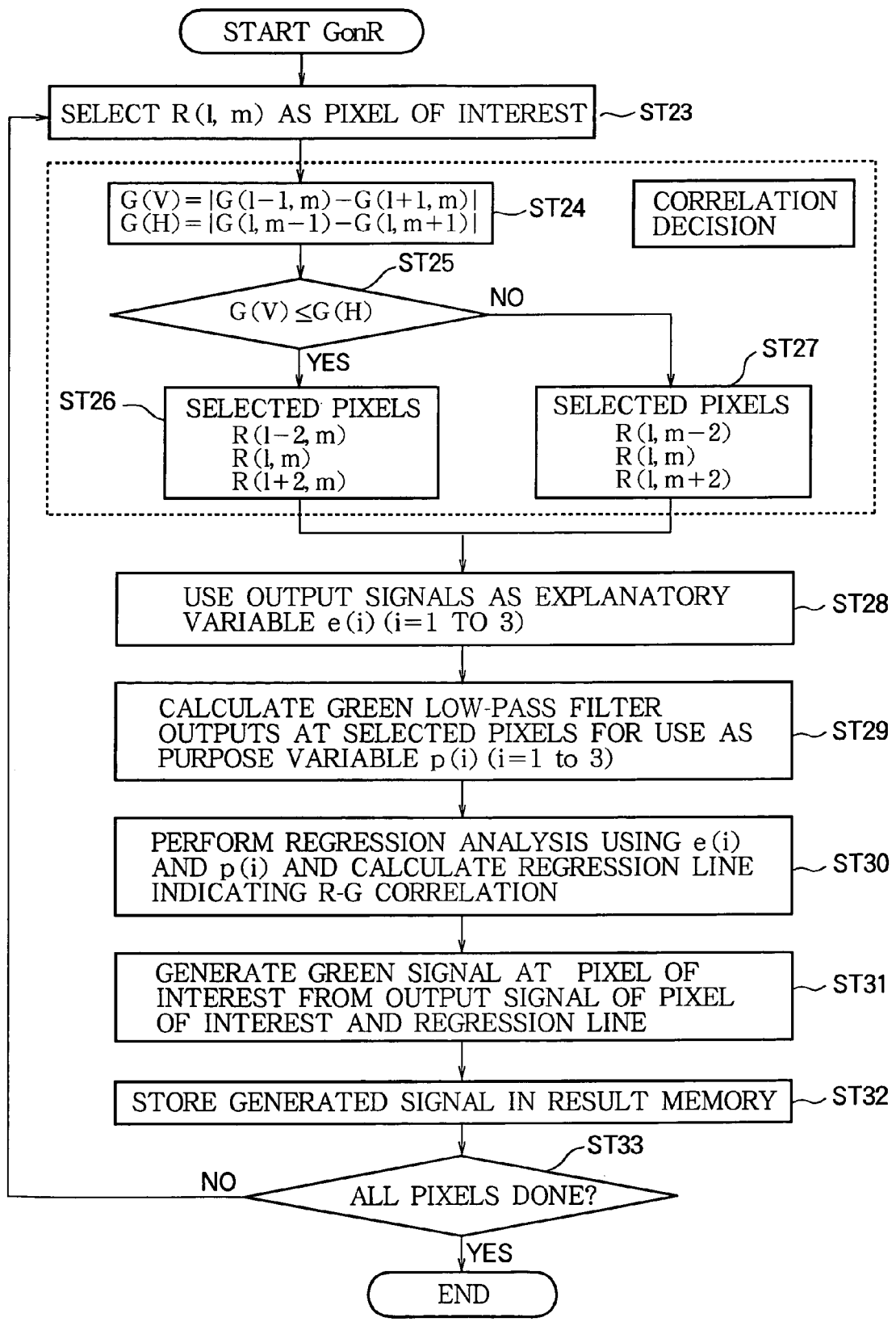
FIG. 13 is a flowchart illustrating the procedure for generating a green signal at a pixel having a red output signal in the second embodiment of the invention.

Next, the operation will be described. The interpolation procedure follows the flowchart in FIG. 5 as in the first embodiment. First, the process in step ST9 in FIG. 5 will be described, in which a pixel having a red output signal is selected as the pixel of interest and a green signal is generated to supply one of its missing colors. FIG. 13 is a flowchart illustrating this procedure.

First, a pixel at a pixel position (l, m) having a red output signal is selected as the pixel of interest (ST23).

Next, the image similarities surrounding the pixel of interest are determined (ST24, ST25, ST26, ST27).

Figure 14:
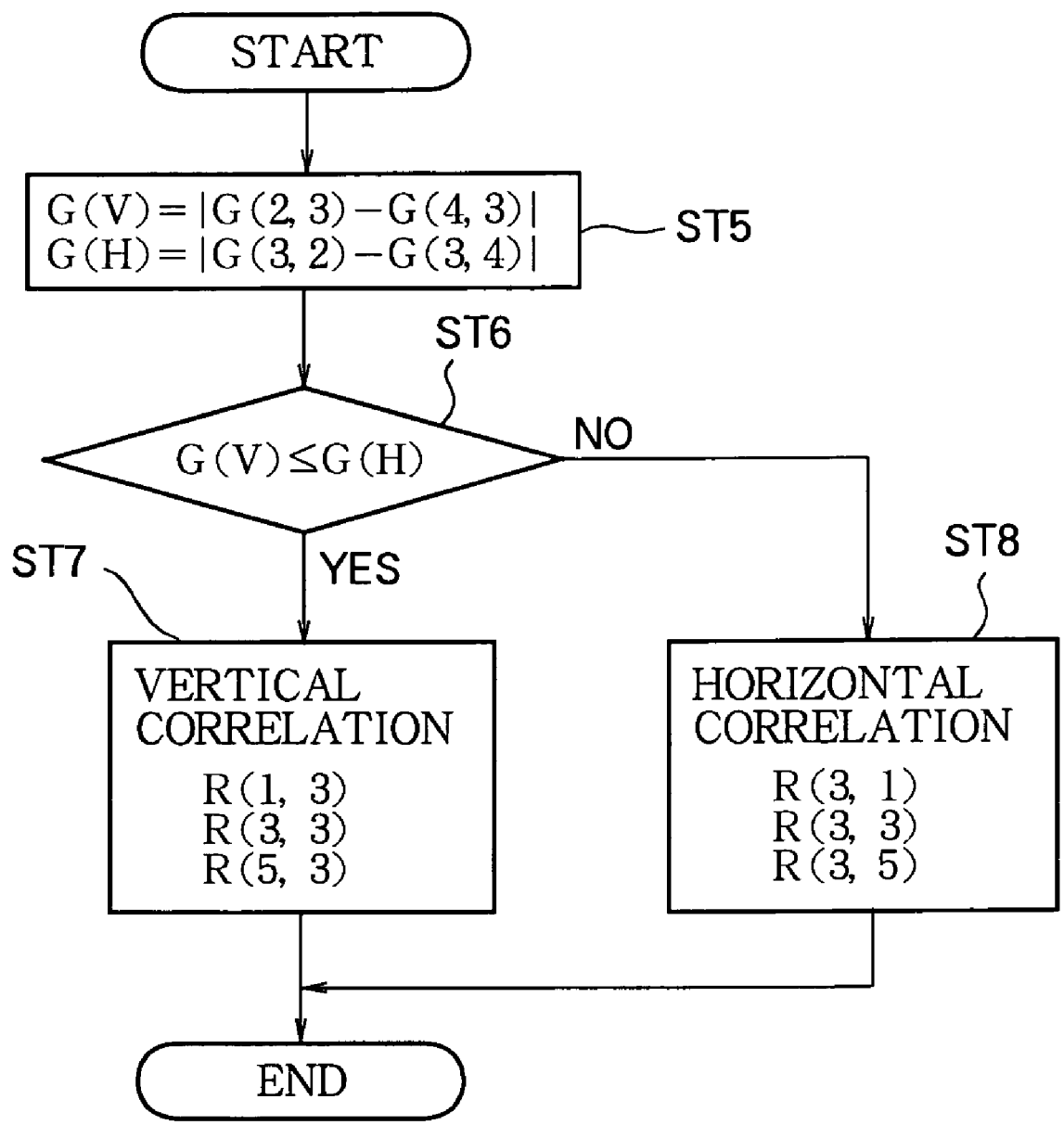
FIG. 14 is a flowchart illustrating the procedure by which the regression analysis means evaluates pixel similarity in the second embodiment of the invention.

The same steps as steps ST24, ST25, ST26, and ST27 in FIG. 13 are also shown in FIG. 14. In FIG. 14, however, exemplary specific coordinate values are given at the pixel positions. The procedure will be described below with reference to steps ST24, ST25, ST26, and ST27 in FIG. 13 and the corresponding steps ST5, ST6, ST7, and ST8 in FIG. 14 along with FIG. 15, which shows pixels surrounding the pixel of interest.

It is assumed here that as the pixel of interest having a red output signal at a pixel position (l, m), the pixel at position (3, 3) in FIG. 15, for example, is selected (step ST23 in FIG. 13). From the pixels above, below, to the left, and to the right of the pixel of interest (the pixels aligned with it in the vertical and horizontal directions), the pixels having output signals of the same color (green) as the missing color to be generated are used to compare image similarity in the horizontal and vertical directions around the pixel of interest. To perform this comparison, the difference values G(V), G(H) of the green pixels present above and below and to the left and right of the pixel of interest are first calculated (step ST24 or ST5). Next, these difference values G(V), G(H) are compared to determine which is smaller and which is larger (step ST25 or ST6), and the direction showing the smaller difference value, either the horizontal (left-right) direction or the vertical (up-down) direction, is determined to be the direction in which a strong similarity exists. Among the pixels aligned in the direction of strong similarity, the pixels neighboring the pixel of interest and having output signals of the same red color as the color of the pixel of interest are then selected (steps ST26 and ST27 or ST7 and ST8).

Specifically, if G(V)≦G(H), the vertical direction is determined to be the direction of strong similarity, and among the pixels aligned in the vertical direction, the pixels R(l−2, m), R(l, m), R(l+2, m) having output signals of the same red color as the color of the pixel of interest, e.g., the pixels R(1, 3), R(3, 3), and R(5, 3), are selected (step ST26 or ST7). If G(V)>G(H), the horizontal direction is determined to be the direction of strong similarity, and among the pixels aligned in the horizontal direction, the pixels R(l, m−2), R(l, m), R(l, m+2) having output signals of the same red color as the color of the pixel of interest, e.g., the pixels R(3, 1), R(3, 3), and R(3, 5), are selected (step ST27 or ST8).

After the similarity has been thus determined, the regression analysis means 10 receives the red output signals of the selected pixels from the frame memory 4 for use as an explanatory variable e(i) (i=1 to 3) (step ST28), and receives the green low-pass filter outputs of the selected pixels from low-pass filter 7b for use as a purpose variable p(i) (i=1 to 3) (step ST29).

The low-pass filters 7a to 7c receive the result of the similarity determination, and perform low-pass filtering for each pixel position based only on the output signals of the pixels aligned in what has been determined to be the direction of strong similarity. In the above determination of similarity, for example, when it is determined that the stronger similarity exists in the vertical direction, the mean value of the output signals of the pixels in an area measuring three pixels vertically by one pixel horizontally with the pixel of interest at the center is output as a low-pass filter output. If in the above determination of similarity it is determined that a stronger similarity exists in the horizontal direction, the average value of the output signals of the pixels in an area measuring one pixel vertically by three pixels horizontally is output as a low-pass filter output. Specifically, when it is determined that a strong similarity exists in the vertical direction, for example, the low-pass filter output at the pixel position (1, 3) in FIG. 15 is obtained as the mean value of the output signals of the pixels included in the area shown by a thick line. The low-pass filter outputs of the other pixel positions (3, 3), (5, 3) are obtained similarly. Accordingly, when the vertical direction is the direction of strong similarity, the green low-pass filter outputs of the selected pixels are calculated by the following equations (25) to (27).

$$G_{LPF}(1, 3)=(G(0, 3)+G(2, 3))/2 \quad (25)$$

$$G_{LPF}(3, 3)=(G(2, 3)+G(4, 3))/2 \quad (26)$$

$$G_{LPF}(5, 3)=(G(4, 3)+G(6, 3))/2 \quad (27)$$

The regression analysis means 10 performs a regression analysis (step ST30) using the explanatory variable e(i) (red output signals) and purpose variable p(i) (green low-pass filter outputs), calculates the slope and intercept values of the regression line showing the correlation between the red and green colors, and then calculates the generated signal of the green color of the pixel of interest (step ST31) as in the first embodiment. The generated signal is stored into the result memory 14 (step ST32).

The above processes are repeated with different pixels of interest, that is, by selecting different pixels as the pixel of interest (step ST33).

The process in step ST9 in FIG. 5 is thereby completed.

In step ST10 in FIG. 5, the above series of processes is performed as in step ST9 but with the color changed from red to blue to obtain green signals at pixels having a blue output signal.

Figure 16:
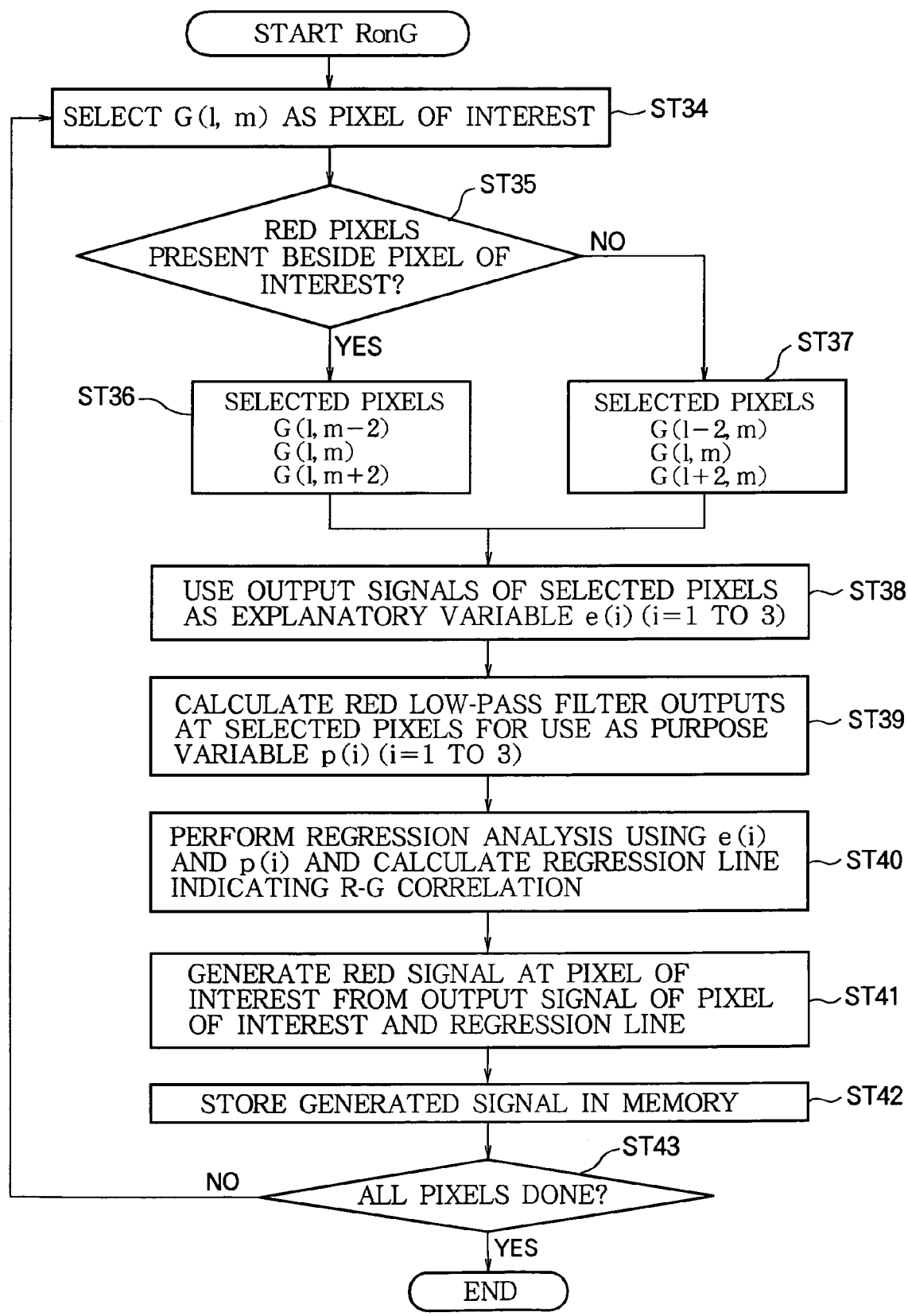
FIG. 16 is a flowchart illustrating the procedure for generating a red signal at a pixel having a green output signal in the second embodiment of the invention.

In step ST11 in FIG. 5, a series of processes is performed to obtain red signals at pixels having a green output signal. These processes differ from those in steps ST9 and ST10 as described below. Step ST11 will be described below in detail with reference to FIGS. 16 and 17.

First, for example, the pixel at pixel position (3, 3) in FIG. 17, having a green output signal, is selected as the pixel of interest (ST34).

In the neighborhood of a pixel having a green output signal, pixels having output signals of the red missing color are aligned only in the horizontal direction or only in the vertical direction. Therefore, the regression analysis means 10 does not determine the similarity direction, but determines whether the pixels having the relevant color are aligned in the horizontal or vertical direction (ST35), and selects the direction in which they are present (steps ST36 and ST37). When the relevant pixels are located in the horizontal direction as shown in FIG. 17, for example, the pixels at pixel positions (l, m−2), (l, m), and (l, m+2), which are aligned in the horizontal direction and have green pixel signals, are selected (ST36). When the relevant pixels are located in the vertical direction (differing from FIG. 17), the pixels at pixel positions (l−2, m), (l, m), and (l+2, m), which are aligned in the vertical direction and have green pixel signals, are selected (ST37).

The other processes (ST38 to ST43) are the same as the processes described in steps ST28 to ST33 in FIG. 13.

That is, as when green signals are generated for pixels having a red output signal, as described with reference to FIG. 13, the output signals of the selected pixels (the signals obtained by A/D conversion of the outputs of the imaging device 2) are set as an explanatory variable e(i) (step ST38), the red low-pass filter outputs of the selected pixels are set as a purpose variable p(i) (step ST39), and a regression analysis is performed (step ST40). The red generated signal of the pixel of interest is then calculated from the resulting regression line and the output signal of the pixel of interest (step ST41). The generated signal is stored into the result memory 14 (step ST42).

The above processes are repeated with different pixels of interest, that is, by selecting different pixels as the pixel of interest (step ST43).

The process in step ST11 in FIG. 5 is thereby completed.

In step ST12 in FIG. 5, a series of processes is performed as in step ST11 above but with the color changed from red to blue to obtain blue signals at pixels having a green output signal.

Figure 18:
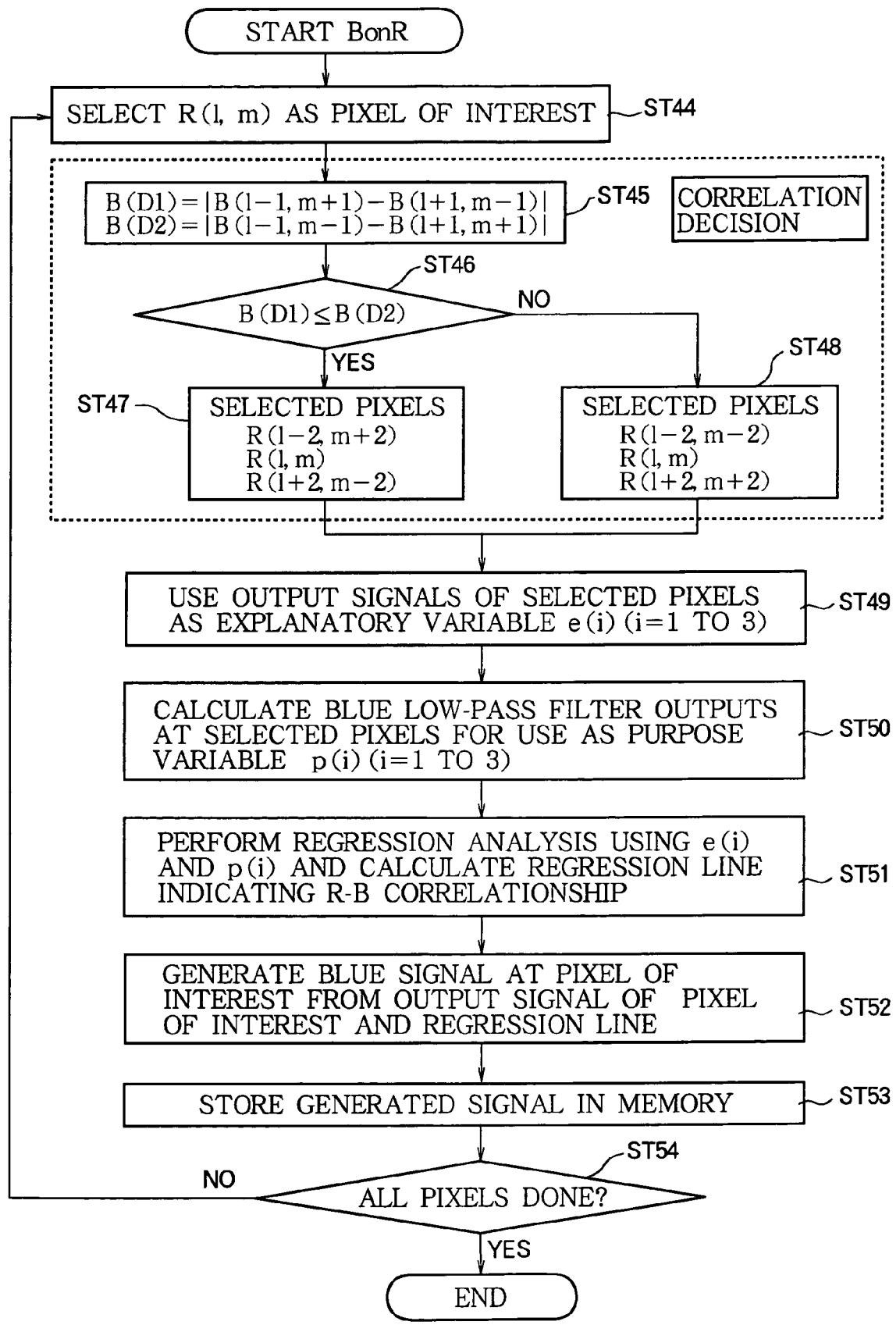
FIG. 18 is a flowchart illustrating the procedure for generating a blue signal at a pixel having a red output signal in the second embodiment of the invention.

In step ST13 in FIG. 5, a series of processes is performed to obtain blue signals at pixels having a red output signal. These processes differ from those in steps ST9 to ST12 as described below. Step ST13 will be described below in detail with reference to FIGS. 18 and 19.

First, the pixel at pixel position (3, 3) in FIG. 19, having a red output signal, is selected as the pixel of interest (ST44).

Next, the similarities among the pixels surrounding the pixel of interest are determined (ST45, ST46, ST47, ST48). In this case, differing from FIG. 13, the similarities in the two diagonal directions tilted by 45 degrees with respect to the horizontal and vertical directions are obtained (steps ST45 to ST48).

That is, from among the pixels aligned in the diagonally ascending and descending directions passing through the pixel of interest, pixels having output signals of the same red color as the missing color to be generated are used to compare image similarities in the diagonally ascending and descending directions passing through the pixel of interest. To perform this comparison, first, the blue pixels aligned in the diagonally ascending direction passing through the pixel of interest and positioned on opposite sides of the pixel of interest are used to calculate the difference value $B(D1)=|B(l-1, m+1)-B(l+1, m-1)|$, and the blue pixels aligned in the diagonally descending direction passing through the pixel of interest and positioned on opposite sides of the pixel of interest are used to calculate the difference value $B(D2)=|B(l-1, m-1)-B(l+1, m+1)|$ (step ST45). Next, these difference values B(D1), B(D2) are compared to determine which is smaller and which is larger (step ST46), and the direction (diagonally ascending or descending direction) having the smaller difference value is determined to be the direction of strong similarity. The pixels neighboring the pixel of interest and having output signals of the same red color as the color of the pixel of interest are then selected from among the pixels located in the direction showing the strong similarity (steps ST47 and ST48).

Specifically, if $B(D1) \leqq B(D2)$, the diagonally ascending direction is determined to be the direction of strong similarity, and the pixels at the pixel positions (l−2, m+2), (l, m), (l+2, m−2) having output signals of the same red color as the color of the pixel of interest are selected from among the pixels aligned in the diagonally ascending direction (step ST47). If $B(D1)>B(D2)$, the diagonally descending direction is determined to be the direction of strong similarity, and the pixels at the pixel positions (l−2, m−2), (l, m), (l+2, m+2) having output signals of the same red color as the color of the pixel of interest are selected from among the pixels aligned in the diagonally descending direction (step ST48).

After the similarity has been thus determined, the regression analysis means 10 receives the red output signals of the selected pixels from the frame memory 4 for use as an explanatory variable e(i) (i=1 to 3) (step ST49), and receives the blue low-pass filter outputs of the selected pixels from low-pass filter 7c for use as a purpose variable p(i) (i=1 to 3) (step ST50).

In this case, the low-pass filter output at each pixel position is obtained by averaging the output signals of two pixels disposed on diagonally opposite sides of the pixel position.

The regression analysis means 10 performs a regression analysis (step ST51) using the explanatory variable e(i) (red output signals) and purpose variable p(i) (blue low-pass filter outputs), calculates the slope and intercept values of the regression line showing a correlation between the read and blue colors, and then calculates the generated signal of the blue color of the pixel of interest (step ST52), as in the first embodiment. The generated signal is stored into the result memory 14 (step ST53).

The above processes are repeated with different pixels of interest, that is, by selecting different pixels of interest (step ST54).

The process in step ST13 in FIG. 5 is thereby completed.

In step ST14 in FIG. 5, the above series of processes is performed as in step ST13 but by interchanging the colors red and blue to obtain red signals at pixels having a blue output signal.

When steps ST9 to ST14 in FIG. 5 are all completed, the missing colors of all pixels have been interpolated, so that if the output signals (pixel signals obtained by A/D conversion of the outputs of the imaging device 2) and the generated signals (pixel signals obtained by interpolation) are combined, pixel signals of all colors are obtained for all pixels. That is, a color image filling one screen is obtained. The calculating means 9 accordingly combines the generated signals stored in the result memory 14 with the output signals stored in the frame memory 4 and outputs them as RGB signals (step ST15).

In the second embodiment, the image similarities surrounding the pixel of interest are determined, and only the output signals of pixels aligned in the determined direction of strong similarity are used as the explanatory variable. As a result, for example, pixels aligned parallel to an edge contour, having a small brightness difference, are selected. Accordingly, it is possible to exclude the effect of the direction showing the weaker similarity (the direction perpendicular to the direction showing the stronger similarity); for example, the effect of the direction normal to an edge can be excluded.

Further, when a regression line is calculated in the second embodiment, instead of low-pass filter outputs, the values of output signals (pixel signals obtained by A/D conversion of the outputs of the imaging device 2) are used directly as the explanatory variable, so it is possible to obtain a regression line that more precisely describes the similarity of local colors. As a result, the missing colors can be generated more precisely.

In the second embodiment, the image similarities surrounding the pixel of interest are determined and only the output signals of pixels aligned in a determined direction of strong similarity are used as an explanatory variable, but the output signals, instead of the low-pass filter outputs, may also be used without determining similarity. That is, the output signals of pixels located in all directions around the pixel of interest (without restricting the direction) may be used as the explanatory variable.

Third Embodiment

Figure 20:
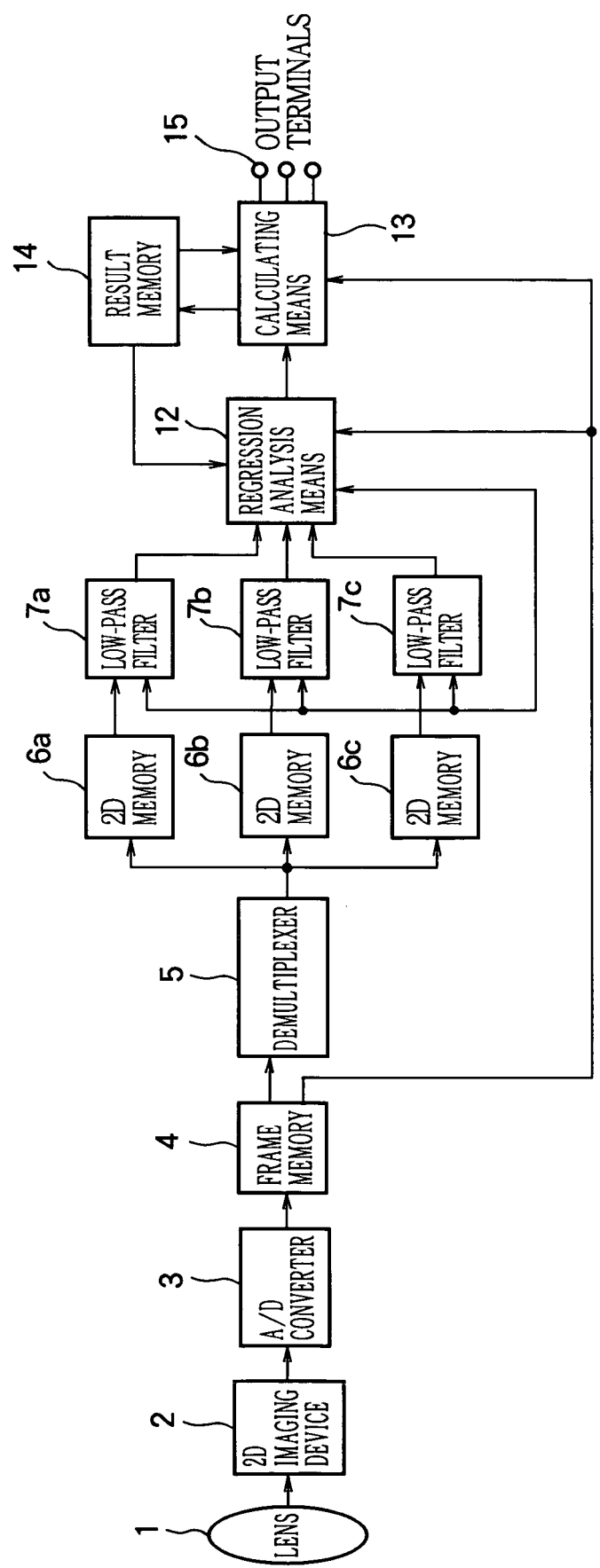
FIG. 20 is a block diagram showing the structure of an imaging device such as a digital still camera equipped with a pixel signal processing apparatus according to a third embodiment of the invention.

FIG. 20 is a block diagram showing the structure of an imaging device having pixel signal processing apparatus according to a third embodiment of the invention.

The third embodiment has the same structure as the second embodiment except for the regression analysis means 12 and calculating means 13.

In the present embodiment, pixel signals generated for a certain color by the interpolation process including regression analysis and calculation as described in the first and second embodiments are used as in the explanatory valuable or purpose variable in regression analysis for interpolating another color. An example will be described below in which the green generated signals calculated in the second embodiment above are used in the calculation of red and blue generated signals.

Next, the operation will be described. The interpolation procedure follows the flowchart in FIG. 5 as in the second embodiment. The process in step ST9 obtains green generated signals at pixel positions having a red output signal, and the process in step ST10 obtains green generated signals at pixel positions having a blue output signal. These generated signals are stored in the result memory 14. The green generated signals stored in the result memory 14 are combined with the green output signals stored in the frame memory 4 to obtain green pixel signals for one full screen.

Figure 21:
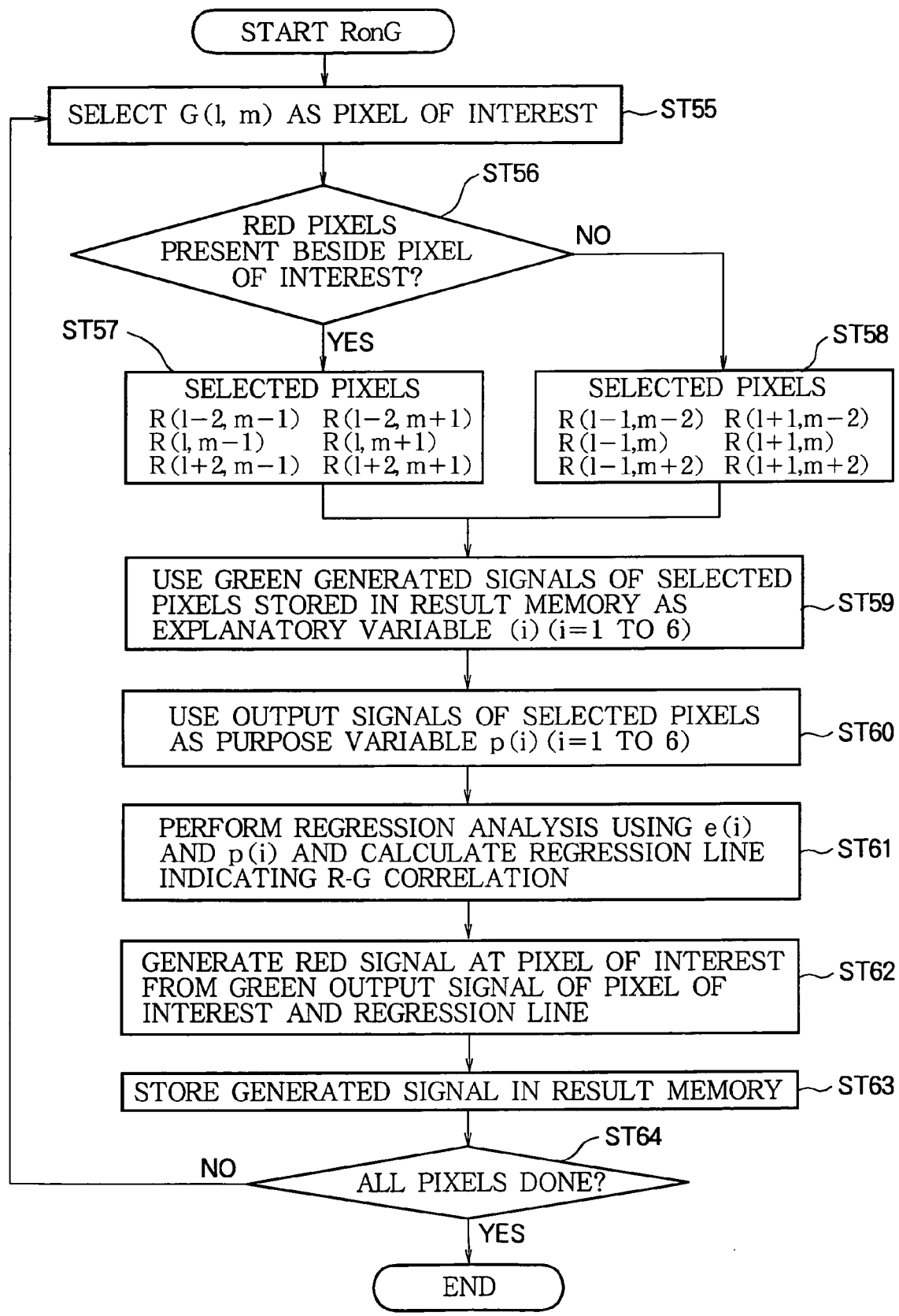
FIG. 21 is a flowchart illustrating the procedure for generating a red signal at a pixel having a green output signal in the third embodiment of the invention.

In step ST11 in FIG. 5, a series of processes is carried out to obtain red signals at pixels having a green output signal. FIG. 21 is a flowchart illustrating the procedure.

First, a pixel at a pixel position (l, m) having a green output signal is selected as the pixel of interest (ST55). It will be assumed as an example that the pixel at pixel position (3, 3) in FIG. 22 is selected.

Differing from steps ST9 and ST10, the regression analysis means 12 does not make a similarity determination, but instead determines whether or not pixels of the same color (red) as the missing color of the pixel of interest are present on the left and right of the pixel of interest (step ST56). If they are present, the pixels at the six pixel positions (l−2, m−1), (l−2, m+1), (l, m−1), (l, m+1), (l+2, m−1), (l+2, m+1) in FIG. 22, neighboring the pixel of interest and having a red output signal, are selected (step ST57); otherwise, the pixels at the six pixel positions (l−1, m−2), (l+1, m−2), (l−1, m), (l+1, m), (l−1, m+2), (l+1, m+2) in FIG. 22, neighboring the pixel of interest and having a red output signal, are selected (step ST58). In FIG. 22, since red pixels are present on the left and right of the pixel of interest, the decision result in step ST56 is 'Yes', and the flow proceeds to step ST57, selecting the pixels at pixel positions (1, 2), (1, 4), (3, 2), (3, 4), (5, 2), and (5, 4).

In step ST59, if the decision in step ST56 was 'Yes', then the green generated signals g(l−2, m−1), g(l−2, m+1), g(l, m−1), g(l, m+1), g(l+2, m−1), g(l+2, m+1) at the selected pixel positions are set as an explanatory variable e(i) (where, i=1 to 6); if the decision in step ST57 was 'No', then the green generated signals g(l−1, m−2), g(l+1, m−2), g(l−1, m), g(l+1, m), g(l−1, m+2), g(l+1, m+2) are set as the explanatory variable e(i) (where, i=1 to 6). In FIG. 22, the green generated signals g(1, 2), g(1, 4), g(3, 2), g(3, 4), g(5, 2), g(5, 4) are set as the explanatory variable e(i) (where, i=1 to 6).

In step ST60, if the decision in step ST56 was 'Yes', then the red output signals R(l−2, m−1), R(l−2, m+1), R(l, m−1), R(l, m+1), R(l+2, m−1), R(l+2, m+1) at the selected pixel positions are set as a purpose variable p(i) (where, i=1 to 6); if the decision in step ST57 was 'No', then the red output signals R(l−1, m−2), R(l+1, m−2), R(l−1, m), R(l+1, m), R(l−1, m+2), R(l+1, m+2) are set as the purpose variable p(i) (where, i=1 to 6). In the example shown in FIG. 22, since the decision in step ST57 was 'Yes', the red output signals R(1, 2), R(1, 4), R(3, 2), R(3, 4), R(5, 2), R(5, 4) are set as the purpose variable p(i) (where, i=1 to 6).

The explanatory and purpose variables thus defined are used to perform a regression analysis, thereby calculating a regression line showing a correlation between the green and red colors in an area neighboring the pixel of interest (step ST61). In this case, to obtain a more precise correlation of the local colors, among the selected pixels at the above six pixel positions (l−2, m−1), (l−2, m+1), (l, m−1), (l, m+1), (l+2, m−1), (l+2, m+1), or (l−1, m−2), (l+1, m−2), (l−1, m), (l+1, m), (l−1, m+2), (l+1, m+2), for example, at the six pixel positions (1, 2), (1, 4), (3, 2), (3, 4), (5, 2), (5, 4) in FIG. 22, pixels having output signals or generated signals that differ significantly from those of the other selected pixels and the pixel of interest may be excluded from the selected pixels when the regression line is calculated.

The calculating means 13 generates the signal of the red missing color of the pixel of interest from the calculated regression line and the output signal G(3, 3) of the pixel of interest (step ST62). The generated signal is stored into the result memory 14 (step ST63).

The above processes are repeated with different pixels of interest, that is, by selecting different pixels of interest (step ST64).

The process in step ST11 in FIG. 5 is thereby completed.

In step ST12 in FIG. 5, a series of processes is performed as in step ST11 above but with the color changed from red to blue to obtain blue signals at pixels having a green output signal. This procedure is the same as in FIG. 21, if the letter 'R' in steps ST55 to ST64 in FIG. 21 is read as 'B'.

First, a pixel at a pixel position (l, m) having a green output signal is selected as the pixel of interest (ST55). It will be assumed as an example that the pixel at pixel position (3, 3) in FIG. 22 is selected.

The regression analysis means 12 determines whether or not pixels of the same color (blue) as the missing color of the pixel of interest are present on the left and right of the pixel of interest (step ST56). If they are present, the pixels at the six pixel positions (l−2, m−1), (l−2, m+1), (l, m−1), (l, m+1), (l+2, m−1), (l+2, m+1) in FIG. 22, neighboring the pixel of interest and having a blue output signal, are selected (step ST57); otherwise, the pixels at the six pixel positions (l−1, m−2), (l+1, m+2), (l−1, m), (l+1, m), (l−1, m+2), (l+1, m+2) in FIG. 22, neighboring the pixel of interest and having a blue output signal, are selected (step ST58). In FIG. 22, since blue pixels are not present on the left and right of the pixel of interest, the decision result in step ST56 is 'No' and the flow proceeds to step ST58, selecting the pixels at the pixel positions (2, 1), (2, 3), (2, 5) (4, 1) (4, 3), (4, 5).

In step ST59, if the decision in step ST56 was 'Yes', then the green generated signals g(l−2, m−1), g(l−2, m+1), g(l, m−1), g(l, m+1), g(l+2, m−1), g(l+2, m+1) at the selected pixel positions are set as an explanatory variable e(i) (where, i=1 to 6); if the decision in step ST57 was 'No', then the green generated signals g(l−1, m−2), g(l+1, m−2), g(l−1, m), g(l+1, m), g(l−1, m+2), g(l+1, m+2) are set as the explanatory variable e(i) (where, i=1 to 6). In FIG. 22, the green generated signals g(2, 1), g(2, 3), g(2, 5), g(4, 1), g(4, 3), g(4, 5) are set as the explanatory variable e(i) (where, i=1 to 6).

In step ST60, if the decision in step ST56 was 'Yes', then the blue output signals B(l−2, m−1), B(l−2, m+1), B(l, m−1), B(l, m+1), B(l+2, m−1), B(l+2, m+1) of the selected pixels are set as a purpose variable p(i) (where, i=1 to 6); if the decision in step ST57 was 'No', then the blue output signals B(l−1, m−2), B(l+1, m−2), B(l−1, m), B(l+1, m), B(l−1, m+2), B(l+1, m+2) are set as the purpose variable p(i) (where, i=1 to 6). In the example shown in FIG. 22, since the decision in step ST57 was 'No', the blue output signals B(2, 1), B(2, 3), B(2, 5), B(4, 1), B(4, 3), B(4, 5) are set as the purpose variable p(i) (where, i=1 to 6).

Next, the explanatory and purpose variables thus defined are used to perform a regression analysis and obtain a regression line describing a correlation between the green and blue colors in an area neighboring the pixel of interest (step ST61). In this case, to obtain a more precise correlation of the local colors, among the selected pixels at the above six pixel positions (l−2, m−1), (l−2, m+1), (l, m−1), (l, m+1), (l+2, m−1), (l+2, m+1), or (l−1, m−2), (l+1, m−2), (l−1, m), (l+1, m), (l−1, m+2), (l+1, m+2), for example, at the six pixel positions (2, 1), (2, 3), (2, 5), (4, 1), (4, 3), (4, 5) in FIG. 22, pixels having output signals or generated signals that are significantly different from those of the other selected pixels and pixel of interest may be excluded from the selected pixels when the regression line is calculated.

The calculating means 13 generates the signal of the missing blue color of the pixel of interest from the calculated regression line and the output signal G(3, 3) of the pixel of interest (step ST62). The generated signal is stored into the result memory 14 (step ST63).

The above processes are repeated with different pixels of interest, that is, by selecting different pixels as the pixel of interest (step ST64).

The process in step ST12 in FIG. 5 is thereby completed.

Figure 23:
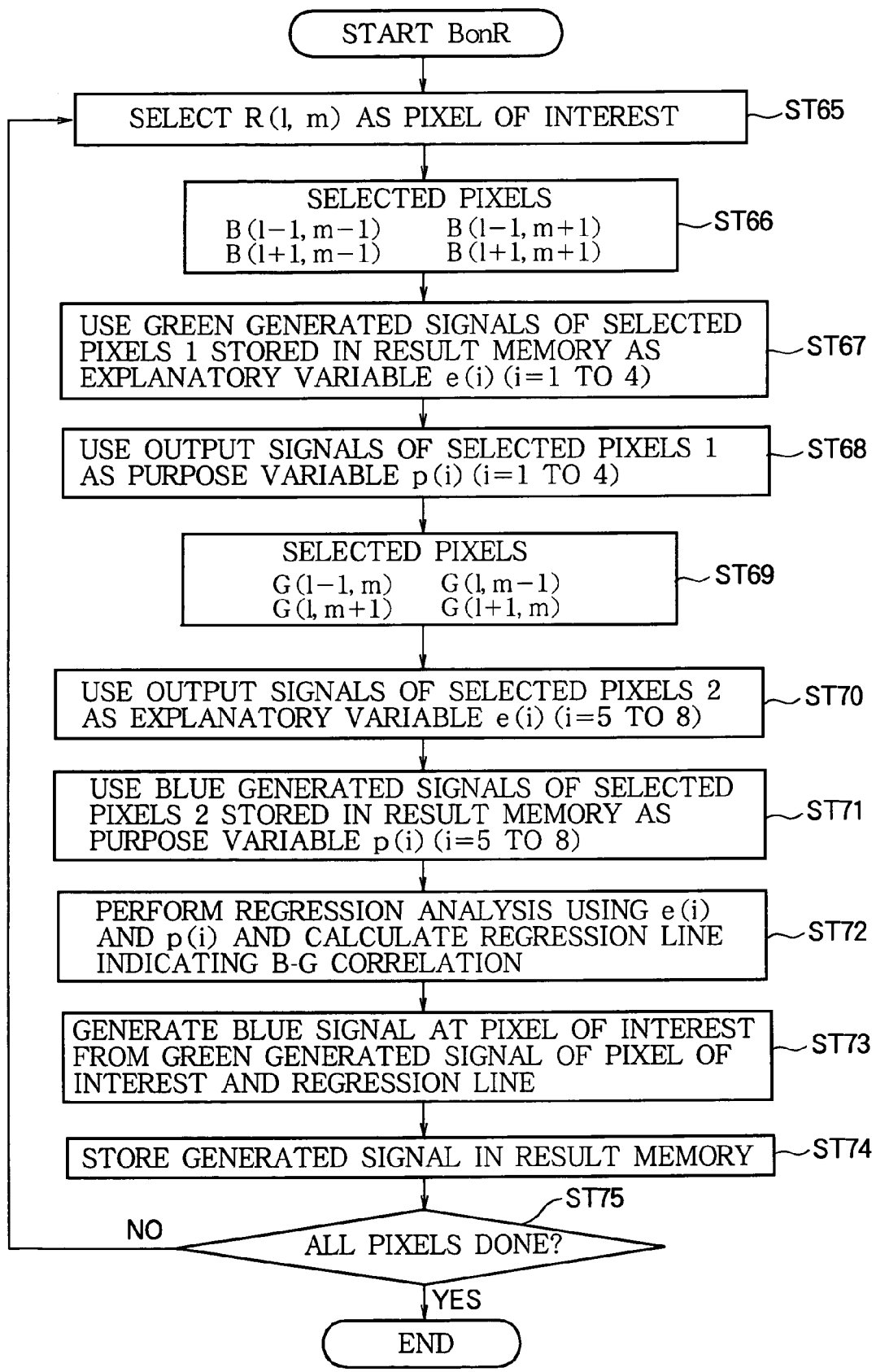
FIG. 23 is a flowchart illustrating the procedure for generating a blue signal at a pixel having a red output signal in the third embodiment of the invention.

In step ST13 in FIG. 5, a series of processes are carried out to obtain blue signals at pixels having a red output signal. FIG. 23 is a flowchart illustrating this procedure.

First, a pixel at a pixel position (l, m) having a red output signal is selected as the pixel of interest (ST65). It will be assumed as an example that the pixel at pixel position (3, 3) in FIG. 24 is selected.

The regression analysis means 12 selects the blue pixels at the four pixel positions (l−1, m−1), (l−1, m+1), (l+1, m−1), (l+1, m+1) or (2, 2), (2, 4), (4, 2), (4, 4) in FIG. 24, neighboring the pixel of interest and having blue output signals, as a first group of selected pixels (first selected pixels) (step ST66).

The green generated signals g(2, 2), g(2, 4), g(4, 2), g(4, 4) at the pixel positions of the first selected pixels, stored in the result memory 14, are then set as part of the explanatory variable e(i) (where, i=1 to 4) (step ST67), and the blue output signals B(2, 2), B(2, 4), B(4, 2), B(4, 4) at the pixel positions of the first selected pixels are set as part of the purpose variable p(i) (where, i=1 to 4) (step ST68).

Further, the pixels at the four pixel positions (l−1, m), (l, m−1), (l, m+1), (l+1, m) or (2, 3), (3, 2), (3, 4), (4, 3) in FIG. 24, having a green output signal, are selected as a second group of selected pixels (second selected pixels) (step ST69).

The green output signals G(2, 3), G(3, 2), G(3, 4), G(4, 3) of the second selected pixels are then set as another part of the explanatory variable e(i) (where, i=5 to 8) (step ST70), and the blue generated signals b(2, 3), b(3, 2), b(3, 4), b(4, 3) of the second selected pixels, stored in the result memory 14, are set as another part of the purpose variable p(i) (where, i=5 to 8) (step ST71).

Next, the explanatory variable e(i) (where, i=1 to 8) and purpose variable p(i) (i=1 to 8) thus defined are used to perform a regression analysis and obtain a regression line describing a correlation between the blue and green colors in an area neighboring the pixel of interest (step ST72). In this case, to obtain a more precise correlation of the local colors, among the selected pixels at the above eight pixel positions (l−1, m−1), (l−1, m+1), (l+1, m−1), (l+1, m+1), (l−1, m), (l, m−1), (l, m+1), (l+1, m), for example, the selected pixels (2, 2), (2, 4), (4, 2), (4, 4), (2, 3), (3, 2), (3, 4), (4, 3) in FIG. 22, pixels having output signals or generated signals that differ significantly from those of the other selected pixels and the pixel of interest may be excluded from the selected pixels when the regression line is calculated.

The calculating means 13 generates the signal of the missing blue color of the pixel of interest from the calculated regression line and then generates the generated signal g(3, 3) of the pixel of interest (step ST73). The generated signal is stored into the result memory 14 (step ST74).

The above processes are repeated with different pixels of interest, that is, by selecting different pixels as the pixel of interest (step ST75).

The process in step ST13 in FIG. 5 is thereby completed.

In step ST14 in FIG. 5, a series of processes is performed as in step ST13 above but by interchanging the red and blue colors to obtain red signals at pixels having a blue output signal. This procedure is the same as in FIG. 23, if the letter 'B' in steps ST65 to ST74 in FIG. 23 is read as 'R.'

When steps ST9 to ST14 in FIG. 5 are all completed, the missing colors of all pixels have been interpolated, so that if the output signals and generated signals are combined with each other, pixel signals of all colors are obtained for all pixels. The calculating means 9 accordingly combines the generated signals stored in the result memory 14 with the output signals stored in the frame memory 4 for output as RGB signals (step ST15).

Instead of using low-pass filter outputs, steps ST11 to ST14 in the third embodiment use the output signals of the pixels and the generated signals obtained by interpolation, so the pixel signals neighboring the pixel of interest can be used directly. Pixel signals in the vicinity of the pixel of interest can also be used. Therefore, a regression line more precisely expressing the similarity of local colors can be obtained. As a result, the missing color signals can be more precisely generated.

In the above first, second, and third embodiments, the two-dimensional imaging device has been described as a device including a Bayer array of color filters of the three colors red, green, and blue, but the invention is generally applicable to any apparatus equipped with an imaging device with N types of photoelectric conversion elements, each having one of a first spectral characteristic to an N-th spectral characteristic (in the above embodiments, N=3), arrayed on a two-dimensional plane.

In the first, second, and third embodiment, the regression analysis means (8, 10, or 12) receives pixel signals having a K-th (in the above examples, K-th denotes red, green, or blue) spectral characteristic and pixel signals having an L-th spectral characteristic (in the above examples, L denotes red, green, or blue but L differs from K) at a plurality of pixel positions in an area neighboring a first pixel position of interest, and performs a regression analysis using the pixel signals having the K-th spectral characteristic as an explanatory variable and the pixel signals having the L-th spectral characteristic as a purpose variable to calculate a regression equation expressing a correlation of the pixel signals having the K-th spectral characteristic with the pixel signals having the L-th spectral characteristic. The calculating means (9 or 13) determines the pixel signal having the L-th spectral characteristic at the first pixel position of interest by applying a conversion formula based on the above regression equation to the pixel signal having the K-th spectral characteristic at the first pixel position of interest.

In the first, second, and third embodiment, the low-pass filters (7a to 7c) perform low-pass filtering on the output signals from the N types of photoelectric conversion elements, and generate low-pass filter outputs corresponding to the first to N-th spectral characteristics.

In the first embodiment, the pixel signals obtained by the low-pass filtering are used as both explanatory and purpose variables; in the second embodiment, the output signals are used as an explanatory variable and the pixel signals obtained by the low-pass filtering are used as a purpose variable.

In the third embodiment, a certain color pixel signal at a certain pixel, generated by the same regression analysis and calculation as in the second embodiment, is used as part of the explanatory variable in a regression analysis for interpolating a pixel signal of another color at another pixel in the neighborhood of the certain pixel.

Instead, a certain color pixel signal at a certain pixel, generated by the same regression analysis and calculation as in the first embodiment, may also be used as the explanatory variable in the regression analysis for interpolating the pixel signal of the other color at another pixel in the neighborhood of the certain pixel.

Further, instead of the regression analyses and calculations used in the first and second embodiments, known interpolating means may also be used. Those interpolating means can be generalized as follows: a pixel signal having the K-th spectral characteristic at a second pixel position of interest, which is located in an area neighboring a first pixel of interest and where there is a pixel signal having an M-th spectral characteristic (M being an integer from 1 to N different from K), is obtained by interpolation based on pixel signals having the M-th spectral characteristic and pixel signals having the K-th spectral characteristic at a plurality of pixel positions in an area neighboring the second pixel position of interest.

A structure in which the interpolation means performs interpolation using the same regression analyses and calculations as in the first and second embodiments can be generally described as follows. That is, the regression analysis means receives pixel signals having the M-th spectral characteristic and pixel signals having the K-th spectral characteristic at a plurality of pixel positions in an area neighboring the second pixel position of interest, and performs a regression analysis using the pixel signals having the M-th spectral characteristic as an explanatory variable and the pixel signals having the K-th spectral characteristic as a purpose variable to calculate a regression equation expressing a correlation of the pixel signals having the M-th spectral characteristic with the pixel signals having the K-th spectral characteristic. The calculating means then determines the pixel signal having the K-th spectral characteristic at the second pixel position of interest by applying a conversion formula based on the regression equation to the pixel signal having the M-th spectral characteristic at the second pixel position of interest. The pixel signal thus obtained as a pixel signal obtained by interpolation and having the K-th spectral characteristic is used as an explanatory variable for interpolating a pixel signal having an L-th spectral characteristic.

The third embodiment further uses pixel signals obtained by the regression analysis and calculation as part of the purpose variable in a regression analysis for interpolating a pixel signal of another color. This is generalized to the case where colors have first to N-th spectral characteristics as described below.

The apparatus has further interpolation means that obtains a pixel signal having an L-th spectral characteristic at a second pixel position of interest by interpolation, based on pixel signals having an M-th spectral characteristic (M being an integer from 1 to N different from L) and pixel signals having the L-th spectral characteristic at a plurality of pixel positions in an area neighboring the second pixel position of interest. In addition, the regression analysis means uses the pixel signals obtained by the above interpolation as part of the purpose variable.

A structure in which the interpolation means comprises the regression analysis means and calculating means described in the above third embodiment can be generally described as follows. That is, the regression analysis means receives pixel signals having an M-th spectral characteristic and pixel signals having an L-th spectral characteristic at a plurality of pixel positions in an area neighboring a second pixel position of interest, and performs a regression analysis using the pixel signals having the M-th spectral characteristic as an explanatory variable and the pixel signals having the L-th spectral characteristic as a purpose variable to calculate a regression equation expressing a correlation of the pixel signals having the M-th spectral characteristic with the pixel signals having the L-th spectral characteristic. The calculating means then determines the pixel signal having the L-th spectral characteristic at the second pixel position of interest by applying a conversion formula based on the regression equation to the pixel signal having the M-th spectral characteristic at the second pixel position of interest. The pixel signal thus obtained as a pixel signal obtained by interpolation and having the L-th spectral characteristic is used as part of the purpose variable.

In the first to third embodiments, the regression means (8, 10, or 12) selects a line represented by the equation $y = a \cdot x + b$ ('y' being a pixel signal with a Y-th spectral characteristic, 'x' being a pixel signal with an X-th spectral characteristic, and 'a' and 'b' being constants) as a regression equation. The calculating means (9 or 13) obtains a pixel signal Y' having the Y-th spectral characteristic at a pixel position of interest by substituting a pixel signal X having the X-th spectral characteristic at the pixel position of interest into the conversion formula Y'=a·X+b based on the above line. When a pixel signal having the L-th spectral characteristic is generated at a first pixel position of interest where there is a pixel signal having the K-th spectral characteristic, X=K, Y=L, and Y'=L'. When a pixel signal having the K-th spectral characteristic is generated at a second pixel position of interest where there is a pixel signal having the M-th spectral characteristic, X=M, Y=K, and Y'=K'. When a pixel signal having the L-th spectral characteristic is generated at a second pixel position of interest where there is a pixel signal having the M-th spectral characteristic, X=M, Y=L, and Y'=L'.

In step ST2 in FIG. 8, the parameters k1, k2, k3 are obtained from an explanatory variable e(i) and a purpose variable p(i), but when the explanatory variable is denoted x(i) and the purpose variable is denoted y(i) as described above, they are obtainable by the following equation.

$$k1 = N \cdot \sum_{i=1}^{N} (x(i) \cdot y(i))$$

$$k2 = \sum_{i=1}^{N} x(i) \cdot \sum_{i=1}^{N} y(i)$$

$$k3 = N \cdot \sum_{i=1}^{N} x(i)^2 - \left(\sum_{i=1}^{N} y(i)\right)^2$$

(N: data count)

What is claimed is:

1. A pixel signal processing apparatus that, given a group of pixel signals from pixels arrayed on a two-dimensional plane, each pixel having one of a first to an N-th spectral characteristic, generates a pixel signal having an L-th spectral characteristic at a pixel position of interest where there is a pixel signal having a K-th spectral characteristic (K and L being different integers between 1 and N, inclusive), comprising:
   a selector for selecting one of the arrayed pixels for the pixel position of interest;
   low-pass filters corresponding to the K-th spectral characteristic and the L-th spectral characteristic, respectively, the low-pass filters processing a plurality of pixel positions in an area neighboring the pixel position of interest;
   a regression analysis device for performing a regression analysis in a plurality of pixel positions in the area neighboring the pixel position of interest, using the pixel signals or outputs of the low-pass filter corresponding to the K-th spectral characteristic as an explanatory variable and the pixel signals or outputs of the low-pass filter corresponding to the L-th spectral characteristic as a purpose variable, to calculate a regression line, $y=a \cdot x+b$ ('y' being the pixel signal or the output of the low-pass filter having the L-th spectral characteristic, 'x' being the pixel signal or the output of the low-pass filter having the K-th spectral characteristic, 'a' and 'b' being constants representing the slope and intercept of the regression line),
   expressing a correlation of the pixel signals having the K-th spectral characteristic with the pixel signals having the L-th spectral characteristic; and
   a calculating device for determining the pixel signal having the L-th spectral characteristic at the pixel position of interest by applying a conversion formula based on the regression line to the pixel signal having the K-th spectral characteristic at the pixel position of interest,
   wherein the selector sequentially selects different ones of the arrayed pixels for the pixel position of interest and, for each selected pixel position of interest, using the regression analysis device and the calculating device to determine the pixel signal having the L-th spectral characteristic,
   the low-pass filter corresponding to the K-th spectral characteristic is configured to process a particular pixel position by outputting a mean value of pixel signals having the K-th spectral characteristic within a predetermined area of the particular pixel position, and
   the low-pass filter corresponding to the L-th spectral characteristic is configured to process the particular pixel position by outputting a mean value of the pixel signals having the L-th spectral characteristic within the predetermined area of the particular pixel position.

2. The pixel signal processing apparatus of claim 1, further comprising an imaging device with N types of photoelectric conversion elements, each having one of the first to N-th spectral characteristics, arrayed on a two-dimensional plane, wherein:
   the selector determines the K-th and L-th spectral characteristics in order of the strength of the correlation between their spectral characteristics.

3. The pixel signal processing apparatus of claim 2, wherein:
   each photoelectric conversion element of the imaging device has one of red (R), green (G), and blue (B) spectral characteristics;
   the selector causes the image processing apparatus to perform the following sequence of operations:
      first, determine as the L-th spectral characteristic the green pixel signals at pixel positions where red pixel signals are present and the green pixel signals at pixel positions where blue pixel signals are present;
      next, determine as the L-th spectral characteristic the red pixel signals at pixel positions where green pixel signals are present and the blue pixel signals at pixel positions where green pixel signals are present; and
      finally, determine as the L-th spectral characteristic the blue pixel signals at pixel positions where red pixel signals are present and the red pixel signals at pixel positions where blue pixel signals are present.

4. The pixel signal processing apparatus of claim 2, wherein the low-pass filters perform low-pass filtering of an output of the imaging device.

5. The pixel signal processing apparatus of claim 2, wherein the regression analysis device uses pixel signals output from the imaging device as the pixel signals having the K-th spectral characteristic.

6. The pixel signal processing apparatus of claim 1, wherein the regression analysis device is configured to:
   determine for the pixel position of interest a direction of strong similarity with respect to the L-th spectral characteristics;
   determine the pixel positions in the area neighboring the pixel position of interest with pixel signals having the K-th characteristic which are aligned in the direction of strong similarity; and
   perform the regression analysis using the low-pass filter outputs of the determined pixel positions as the explanatory variable.

7. The pixel signal processing apparatus according to claim 1, wherein the low-pass filters obtain a low-pass filter output for the L-th spectral characteristic, for each of the pixel positions, by low-pass filtering of the pixel signals having the L-th spectral characteristic surrounding said each of the pixel positions, and obtains a low-pass filter output for the K-th spectral characteristic, for each of the pixel positions, by low-pass filtering of the pixel signals having the K-th spectral characteristic surrounding said each of the pixel positions.

8. The pixel signal processing apparatus according to claim 1, wherein the low-pass filters obtain a low-pass filter output of the pixel signal having the L-th spectral characteristic at each of the pixel positions where there is a pixel signal having the K-th spectral characteristic by low-pass filtering of the pixel signals having the L-th spectral characteristic surrounding each of the pixel positions where there is a pixel signal having the K-th spectral characteristic among a plurality of pixel positions in an area neighboring the pixel position of interest, and obtains a low-pass filter output of the pixel signal having the K-th spectral characteristic at each of the pixel positions where there is a pixel signal having the L-th spectral characteristic by low-pass filtering of the pixel signals having the K-th spectral characteristic surrounding each of the pixel positions where there is a pixel signal having the L-th spectral characteristic among a plurality of pixel positions in an area neighboring the pixel position of interest.

9. The pixel signal processing apparatus of claim 1, wherein the regression analysis device uses pixel signals obtained by interpolation as the pixel signals having the K-th spectral characteristic or the pixel signals having the L-th spectral characteristic.

10. A pixel signal processing method that, given a group of pixel signals from pixels arrayed on a two-dimensional plane, each pixel having one of a first to an N-th spectral characteristic, generates a pixel signal having an L-th spectral characteristic at a pixel position of interest where there is a pixel signal having a K-th spectral characteristic (K and L being different integers between 1 and N, inclusive), comprising:

selecting one of the arrayed pixels for the pixel position of interest;

applying low-pass filtering to a plurality of pixel positions in an area neighboring the pixel position of interest according to the K-th spectral characteristic and the L-th spectral characteristic;

performing a regression analysis in the plurality of pixel positions in the area neighboring the pixel position of interest, using the pixel signals or the low-pass filtered outputs having the K-th spectral characteristic as an explanatory variable, and using the pixel signals or the low-pass filtered outputs having the L-th spectral characteristic as a purpose variable, to calculate a regression line, $$y = a \cdot x + b$$

('y' being the pixel signal or the output of the low-pass filter having the L-th spectral characteristic, 'x' being the pixel signal or the output of the low-pass filter having the K-th spectral characteristic, 'a' and 'b' being constants representing the slope and intercept of the regression line), expressing a correlation of the pixel signals having the K-th spectral characteristic with the pixel signals having the L-th spectral characteristic; and determining the pixel signal having the L-th spectral characteristic at the pixel position of interest by applying a conversion formula based on the regression line to the pixel signal having the K-th spectral characteristic at the pixel position of interest, wherein the selecting step sequentially selects different ones of the arrayed pixels for the pixel position of interest and, for each selected pixel position of interest, applying the steps of performing the regression analysis and determining the pixel signal having the L-th spectral characteristic, and the low-pass filtering step processes a particular pixel position by outputting a mean value of pixel signals having the K-th spectral characteristic within a predetermined area of the particular pixel position, and outputting a mean value of the pixel signals having the L-th spectral characteristic within the predetermined area of the particular pixel position.

11. The pixel signal processing method of claim 10, wherein said pixel signals are associated with an imaging device with N types of photoelectric conversion elements, each having one of the first to N-th spectral characteristics, arrayed on a two-dimensional plane, and wherein the method further comprises:

determining the K-th and L-th spectral characteristics in order of the strength of the correlation between their spectral characteristics.

12. The pixel signal processing method of claim 10, wherein:

each photoelectric conversion element has one of red (R), green (G), and blue (B) spectral characteristics; and the following sequence of operations is performed:

first, the green pixel signals are determined as the L-th spectral characteristic at pixel positions where red pixel signals are present and where blue pixel signals are present, respectively;

next, the red pixel signals are determined as the L-th spectral characteristic at pixel positions where green pixel signals are present, and the blue pixel signals are determined as the L-th spectral characteristic at pixel positions where green pixel signals are present; and finally, the blue pixel signals are determined as the L-th spectral characteristic at pixel positions where red pixel signals are present, and the red pixel signals are determined as the L-th spectral characteristic at pixel positions where blue pixel signals are present.

13. The pixel signal processing method of claim 10, wherein the low-pass filtering is performed on an output of the imaging device.

14. The pixel signal processing method of claim 10, wherein the regression analysis uses pixel signals output from the imaging device as the pixel signals having the K-th spectral characteristic.

15. The pixel signal processing method of claim 9, wherein performing the regression analysis includes:

determining for the pixel position of interest a direction of strong similarity with respect to the L-th spectral characteristics;

determining the pixel positions in the area neighboring the pixel position of interest with pixel signals having the K-th characteristic which are aligned in the direction of strong similarity; and using the low-pass filter outputs of the determined pixel positions as the explanatory variable.

16. The pixel signal processing method according to claim 10, wherein the low-pass filtering obtains a low-pass filter output for the L-th spectral characteristic, for each of the pixel positions, by low-pass filtering of the pixel signals having the L-th spectral characteristic surrounding said each of the pixel positions, and obtains a low-pass filter output for the K-th spectral characteristic, for each of the pixel positions, by low-pass filtering of the pixel signals having the K-th spectral characteristic surrounding said each of the pixel positions.

17. The pixel signal processing method according to claim 9, wherein the low-pass filtering obtains a low-pass filter output of the pixel signal having the L-th spectral characteristic at each of the pixel positions where there is a pixel signal having the K-th spectral characteristic by low-pass filtering of the pixel signals having the L-th spectral characteristic surrounding each of the pixel positions where there is a pixel signal having the K-th spectral characteristic among a plurality of pixel positions in an area neighboring the pixel position of interest, and obtains a low-pass filter output of the pixel signal having the K-th spectral characteristic at each of the pixel positions where there is a pixel signal having the L-th spectral characteristic by low-pass filtering of the pixel signals having the K-th spectral characteristic surrounding each of the pixel positions where there is a pixel signal having the L-th spectral characteristic among a plurality of pixel positions in an area neighboring the pixel position of interest.

18. The pixel signal processing apparatus of claim 10, wherein the regression analysis uses pixel signals obtained by interpolation as the pixel signals having the K-th spectral characteristic or the pixel signals having the L-th spectral characteristic.

* * * * *